(12) United States Patent
Tayama et al.

(10) Patent No.: US 9,746,116 B2
(45) Date of Patent: Aug. 29, 2017

(54) PIPE CONNECTOR

(71) Applicant: SANOH INDUSTRIAL CO., LTD., Tokyo (JP)

(72) Inventors: Koji Tayama, Ibaraki (JP); Satoshi Matsubara, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 14/783,236

(22) PCT Filed: Apr. 1, 2014

(86) PCT No.: PCT/JP2014/059673
§ 371 (c)(1),
(2) Date: Oct. 8, 2015

(87) PCT Pub. No.: WO2014/171329
PCT Pub. Date: Oct. 23, 2014

(65) Prior Publication Data
US 2016/0069496 A1 Mar. 10, 2016

(30) Foreign Application Priority Data
Apr. 16, 2013 (JP) ................................. 2013-085859

(51) Int. Cl.
*F16L 39/00* (2006.01)
*F16L 37/12* (2006.01)
(Continued)

(52) U.S. Cl.
CPC ......... *F16L 37/1225* (2013.01); *F16L 21/045* (2013.01); *F16L 21/08* (2013.01);
(Continued)

(58) Field of Classification Search
USPC .......................................... 285/305, 319, 317
See application file for complete search history.

(56) References Cited

U.S. PATENT DOCUMENTS

2011/0031052 A1* 2/2011 Inoue ................. F02M 37/0017
180/69.4

FOREIGN PATENT DOCUMENTS

EP 1 526 320 A1 4/2005
JP 2004060884 A 2/2004
(Continued)

OTHER PUBLICATIONS

Extended European Search Report issued in corresponding European Patent Application No. 14785681.9, dated Nov. 22, 2016.
(Continued)

*Primary Examiner* — Aaron Dunwoody
(74) *Attorney, Agent, or Firm* — Marshall, Gerstein & Borun LLP

(57) ABSTRACT

A retainer is equipped with a regulation segment, which regulates the position of an O-ring placed in an insertion hole, and a prevention segment, which engages with a spool of a pipe and prevents the pipe from being removed from the insertion hole. Moreover, by moving the retainer toward the minus side in the Y direction and attaching it to an attachment segment, the retainer becomes sandwiched between an opposing wall portion and a tube segment in the X direction. Because of this, the number of parts can be reduced and the retainer that regulates the position of the O-ring can be prevented from being moved in the X direction by the pressure of fluid flowing inside the pipe connector in the X direction.

4 Claims, 18 Drawing Sheets

(51) Int. Cl.
| | |
|---|---|
| *F16L 21/04* | (2006.01) |
| *F16L 21/08* | (2006.01) |
| *F16L 37/088* | (2006.01) |
| *F16L 37/14* | (2006.01) |

(52) U.S. Cl.
CPC .......... *F16L 37/088* (2013.01); *F16L 37/144* (2013.01); *F16L 2201/10* (2013.01)

(56) References Cited

FOREIGN PATENT DOCUMENTS

| | | |
|---|---|---|
| JP | 2005-172161 A | 6/2005 |
| JP | 4041457 B2 | 1/2008 |
| JP | 2009-236206 A | 10/2009 |
| JP | 201332801 A | 2/2013 |
| WO | WO-2005/106312 A1 | 11/2005 |

OTHER PUBLICATIONS

Notice of Reasons for Rejection (office action) from Patent Application No. 2013-085859 dated Nov. 5, 2013.
International Search Report from International Application No. PCT/JP2014/059673 dated May 13, 2014.

\* cited by examiner

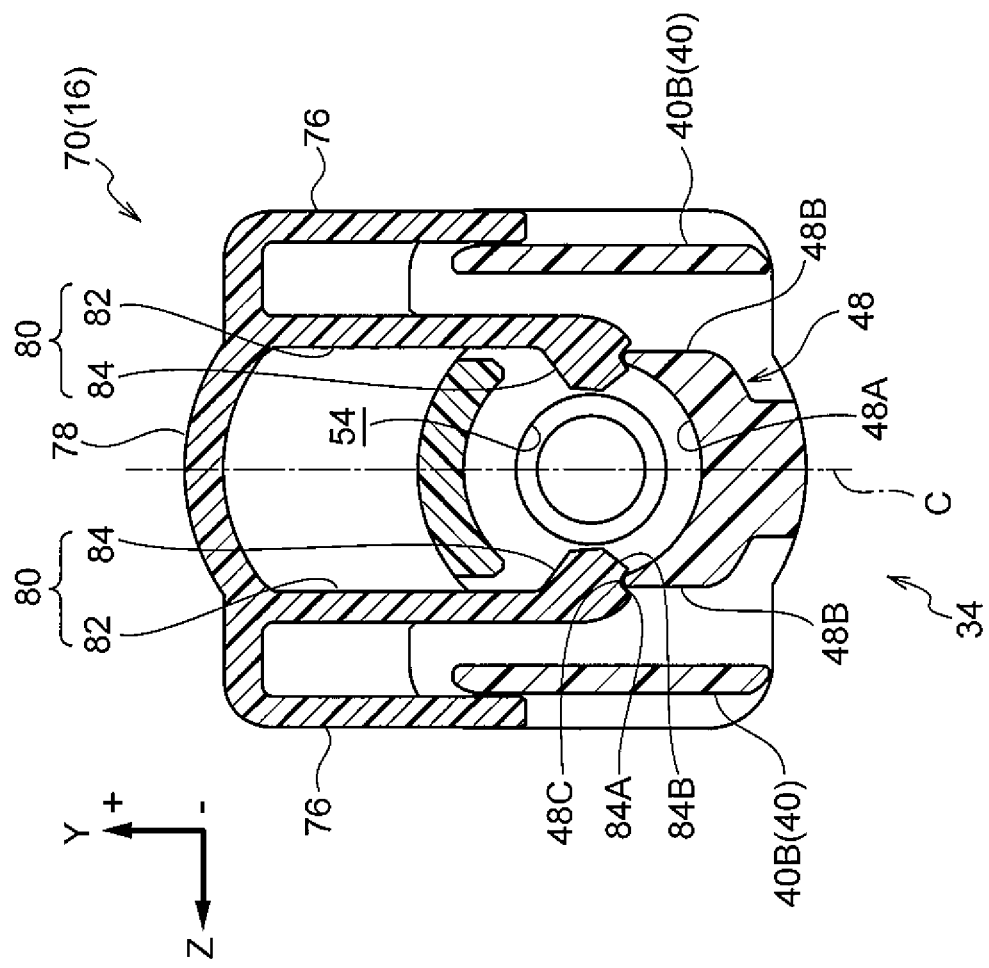

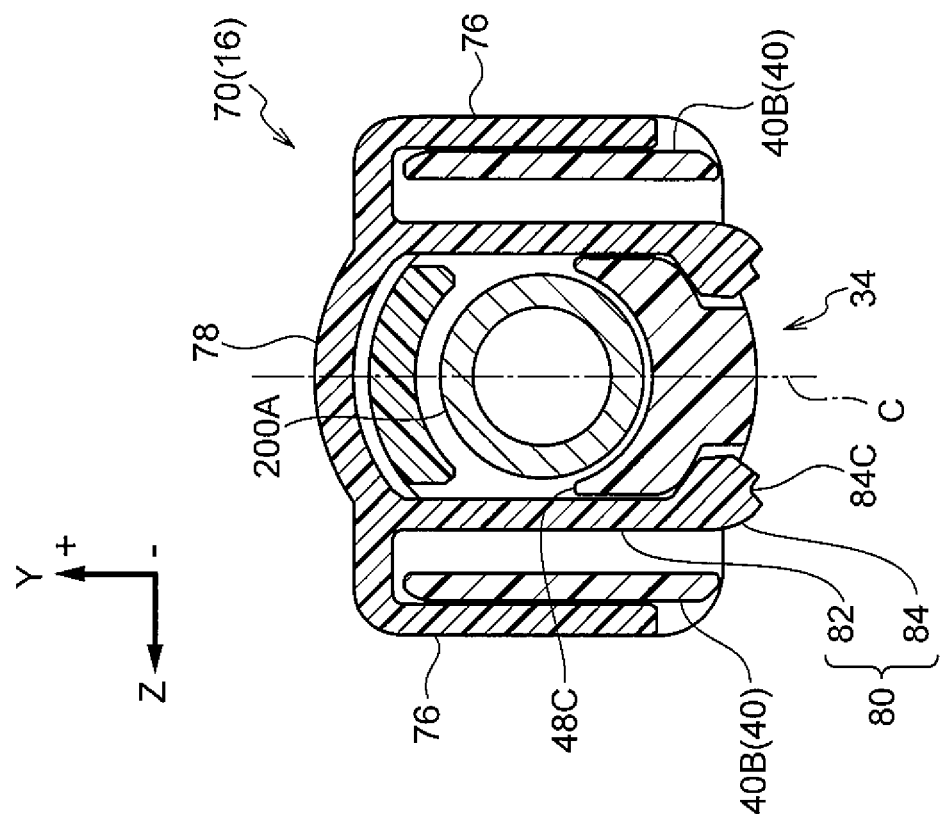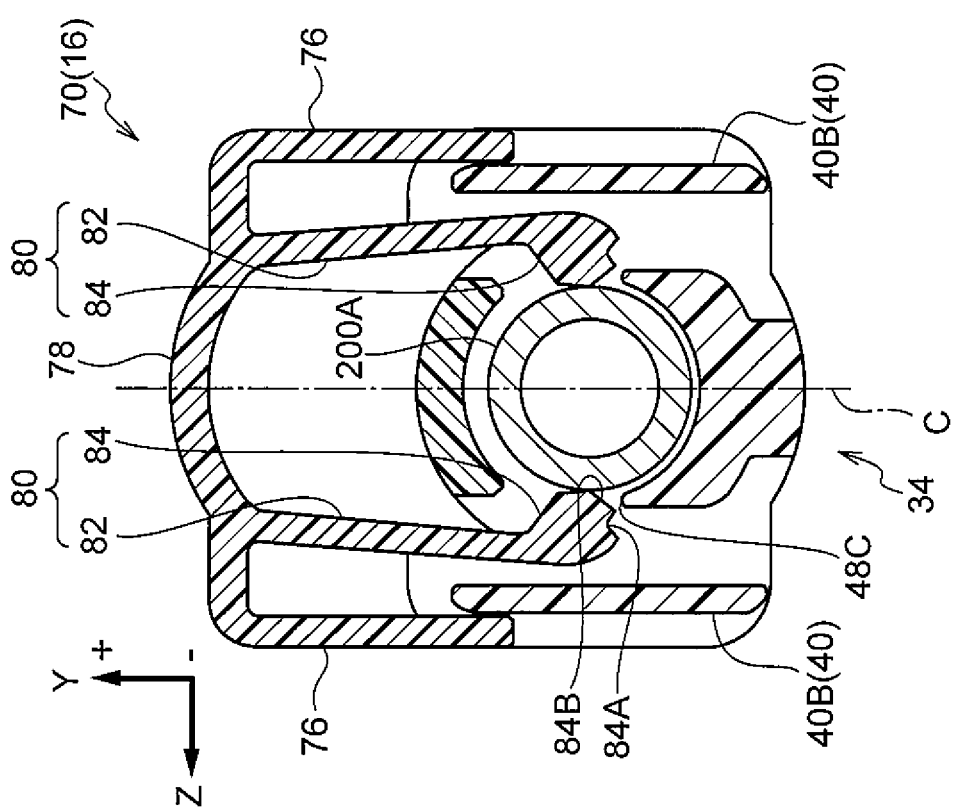

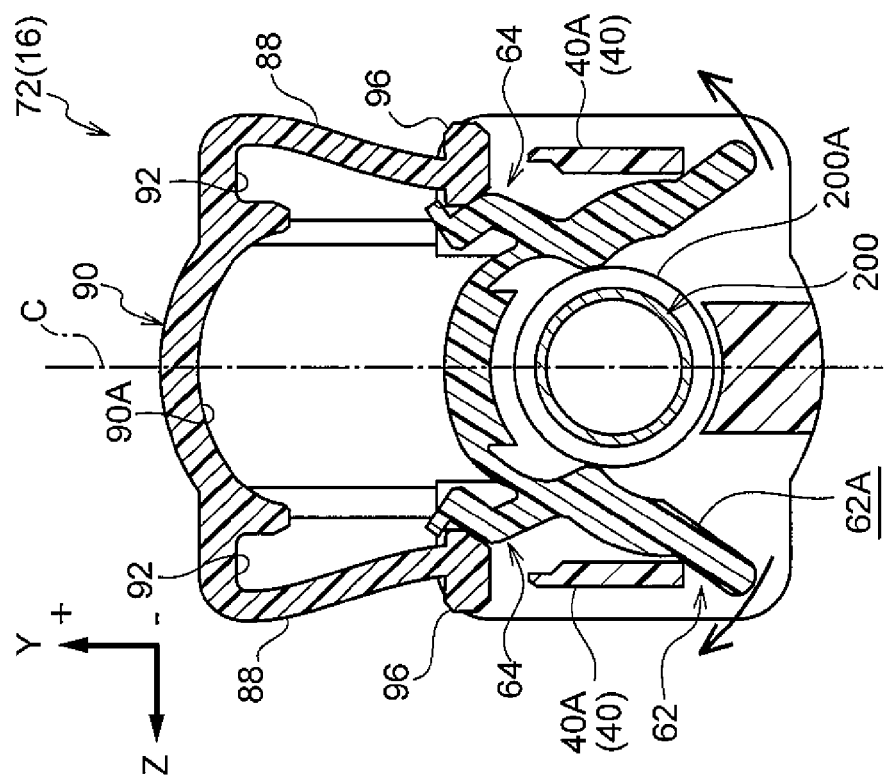
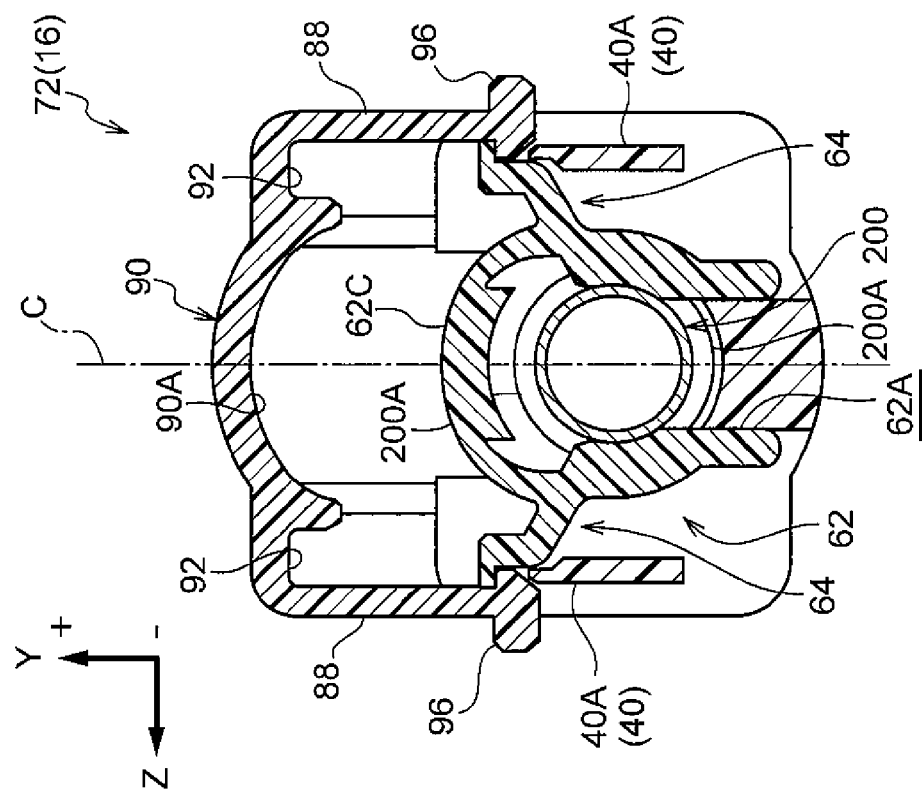

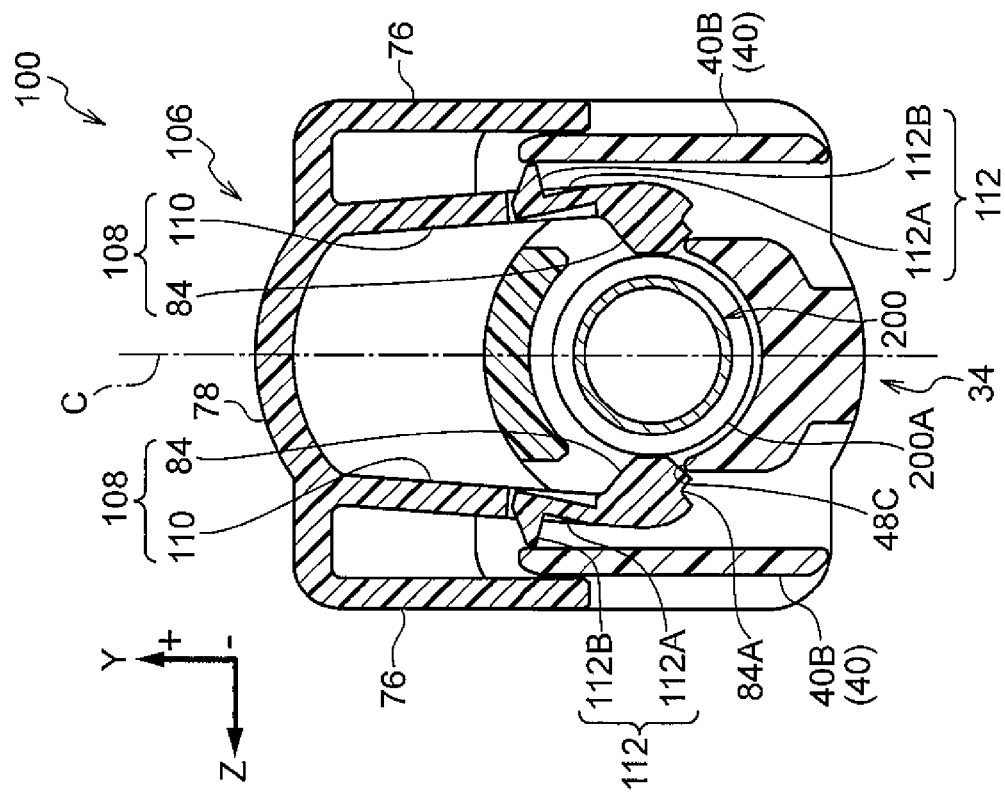
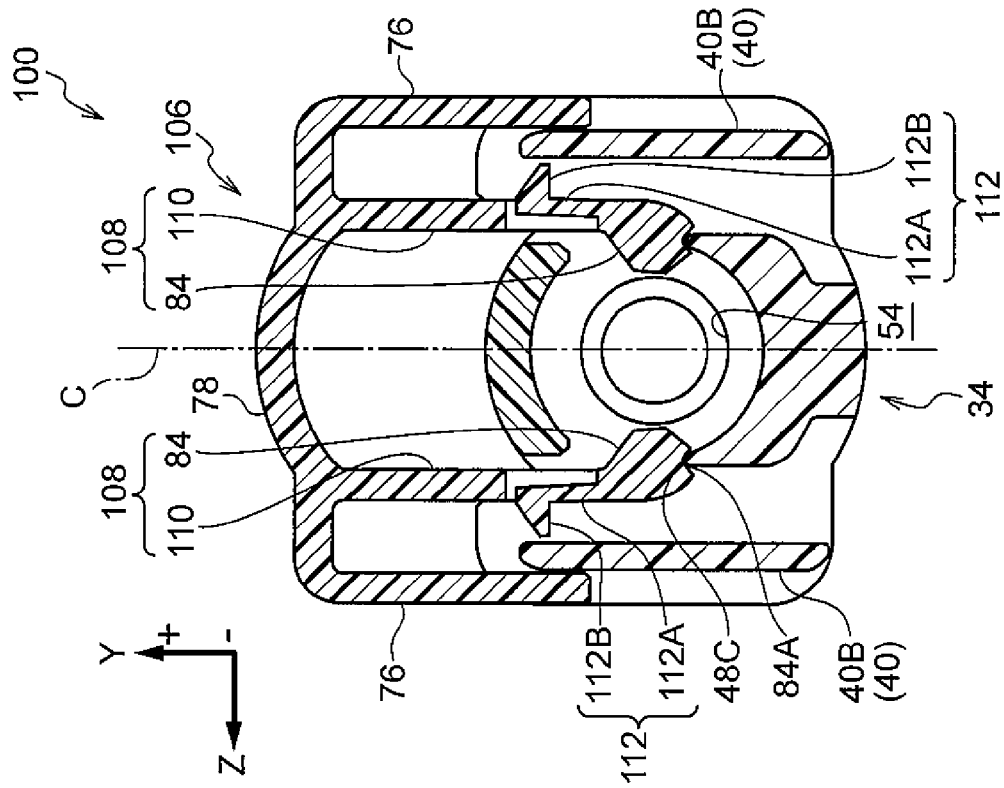

US 9,746,116 B2

PIPE CONNECTOR

TECHNICAL FIELD

The present invention relates to a pipe connector.

BACKGROUND ART

In the pipe connector (quick connector) disclosed in patent document 1 (JP-A No. 2005-172161), a top hat that regulates the position of a sealing O-ring disposed in the pipe connector and a retainer that retains a pipe attached to the pipe connector are separate bodies.

SUMMARY OF INVENTION

In this way, in the conventional pipe connector, the top hat that regulates the position of the sealing O-ring disposed in the pipe connector and the retainer that retains the pipe attached to the pipe connector have been different parts.

It is a problem of the present invention to reduce the number of parts and prevent a position regulating member that regulates the position of an O-ring from being moved by the pressure of fluid flowing inside a pipe connector.

A pipe connector of a first aspect of the present invention comprises: a housing in which is formed an insertion hole into which is inserted an end portion of a pipe having an annular spool; an O-ring that is placed in the insertion hole, is in contact with an outer peripheral surface of the pipe inserted into the housing, and seals the space between an inner peripheral surface of the insertion hole and the outer peripheral surface of the pipe; and a regulation and prevention member that is attached to the housing from an intersecting direction intersecting an insertion direction of the pipe, the regulation and prevention member having a regulation segment that regulates the position, in the insertion direction, of the O-ring placed in the insertion hole and a prevention segment that engages with the spool of the pipe having the end portion inserted into the insertion hole and prevents the pipe from being removed from the insertion hole.

According to this configuration, the regulation and prevention member has the regulation segment that regulates the position, in the insertion direction, of the O-ring placed in the insertion hole and the prevention segment that engages with the spool of the pipe having the end portion inserted into the insertion hole and prevents the pipe from being removed from the insertion hole. Because of this, the number of parts is reduced.

Furthermore, the regulation and prevention member is attached to the housing from the intersecting direction intersecting the insertion direction of the pipe. In this way, the regulation and prevention member is attached to the housing from the intersecting direction intersecting the insertion direction of the pipe. For this reason, compared to a case where the regulation and prevention member is attached to the housing from the insertion direction, movement of the regulation and prevention member caused by the pressure of fluid flowing inside the pipe connector along the insertion direction of the pipe is prevented.

As described above, by using this pipe connector, the number of parts can be reduced and the regulation and prevention member (position regulating member) that regulates the position of the O-ring can be prevented from being moved by the pressure of fluid flowing inside the pipe connector.

In the above aspect, an attachment segment that configures the housing and to which the regulation and prevention member is attached is formed on an insertion side of the insertion hole into which the pipe is inserted, the O-ring is placed in an end portion of the insertion hole on the insertion side in the insertion direction, and a regulation surface that is in contact with the O-ring in the insertion direction and regulates movement of the O-ring in the insertion direction is formed in the regulation segment of the regulation and prevention member attached to the attachment segment.

According to this configuration, the O-ring is placed in the end portion of the insertion hole on the insertion side in the insertion direction. For this reason, the workability of placing the O-ring in the insertion hole can be improved compared to a case where the O-ring is placed in the center of the insertion hole in the insertion direction.

In the above aspect, the regulation and prevention member is integrally molded of a resin material.

According to this configuration, the regulation and prevention member is integrally molded of a resin material, so the regulation and prevention member can be given an inexpensive configuration compared to a case where the regulation and prevention member is configured by combining plural members.

According to the pipe connector of the present invention, the number of parts can be reduced and the regulation and prevention member that regulates the position of the O-ring can be prevented from being moved by the pressure of fluid flowing inside the pipe connector.

BRIEF DESCRIPTION OF DRAWINGS

FIG. 10 is a cross-sectional view showing, in the pipe connector pertaining to the first embodiment of the present invention, the state in which the confirmation member has been placed in the temporary fastening position;

FIG. 11A is a cross-sectional view showing, in the pipe connector pertaining to the first embodiment of the present invention, a state when the confirmation member moves from the temporary fastening position to the engagement confirmation position;

FIG. 11B is a cross-sectional view showing, in the pipe connector pertaining to the first embodiment of the present invention, the state when the confirmation member moves from the temporary fastening position to the engagement confirmation position;

FIG. 15A is a cross-sectional view showing, in the pipe connector pertaining to the first embodiment of the present invention, the state when lifting up the confirmation member from the temporary fastening position;

FIG. 15B is a cross-sectional view showing, in the pipe connector pertaining to the first embodiment of the present invention, the state when lifting up the confirmation member from the temporary fastening position;

FIG. 17A is a cross-sectional view showing, in the pipe connector pertaining to the second embodiment of the present invention, a state when lifting up the confirmation member from the temporary fastening position;

FIG. 17B is a cross-sectional view showing, in the pipe connector pertaining to the second embodiment of the present invention, the state when lifting up the confirmation member from the temporary fastening position.

DESCRIPTION OF EMBODIMENTS

First Embodiment

Figure 1:
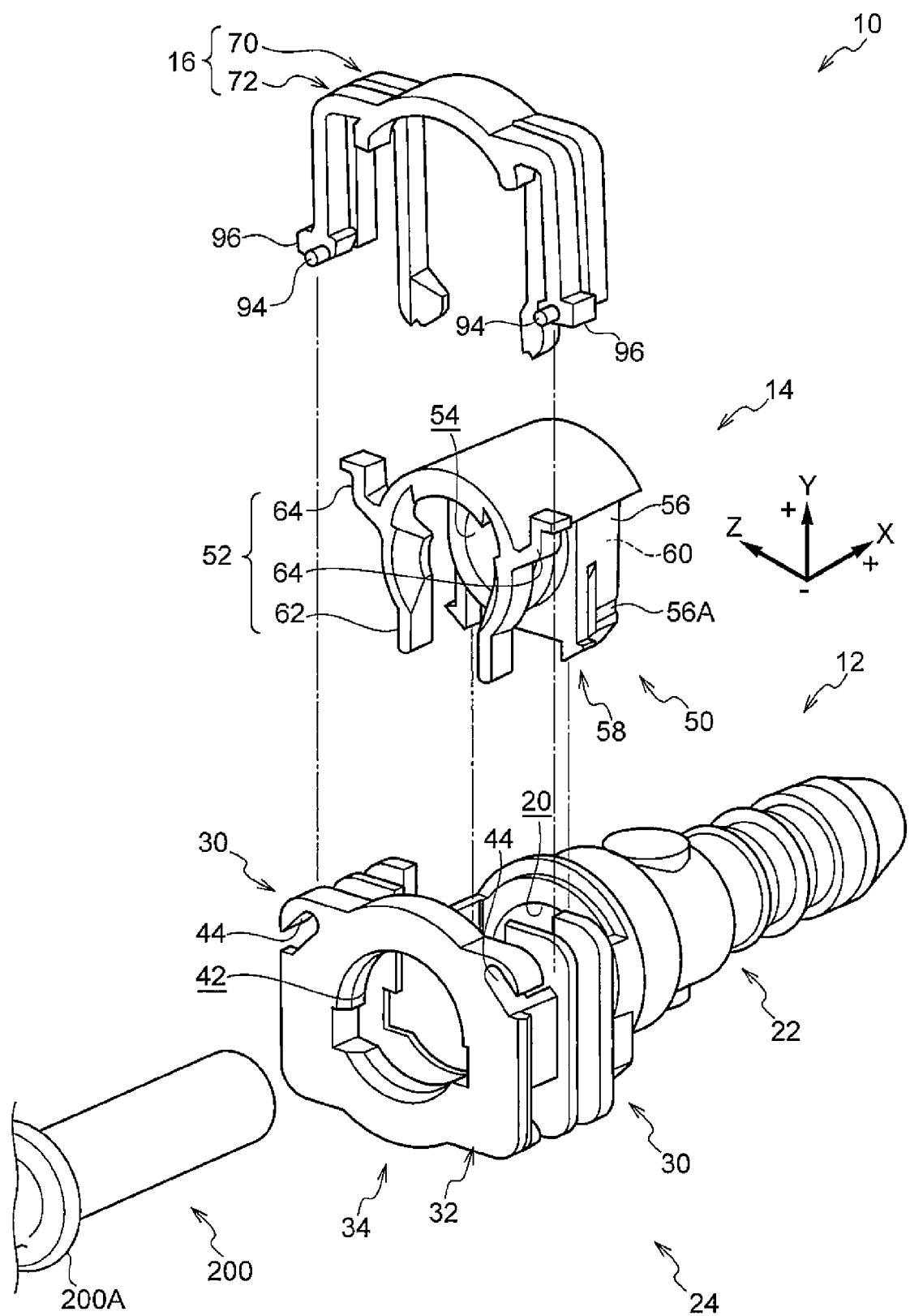
FIG. 1 is an exploded perspective view showing a pipe connector pertaining to a first embodiment of the present invention.

An example of a pipe connector pertaining to a first embodiment of the present invention will be described in accordance with FIG. 1 to FIG. 15.

(Overall Configuration)

A pipe connector 10 has a tube (not shown in the drawings) secured to one end, and on its other end an end portion of a pipe 200 having on its outer peripheral surface an annular spool 200A is inserted into a later-described insertion hole 20, so that the pipe connector 10 communicates the flow path in the pipe 200 and the flow path in the tube in communication with one another.

As shown in FIG. 1, the pipe connector 10 is equipped with a housing 12 that extends in an insertion direction (hereinafter called the "X direction") of the pipe 200 inserted into the insertion hole 20. Moreover, the pipe connector 10 is equipped with a retainer 14 serving as an example of a regulation and prevention member that is attached to the housing 12, engages with the spool 200A of the pipe 200, and prevents the pipe 200 inserted into the insertion hole 20 from being removed.

Figure 3:
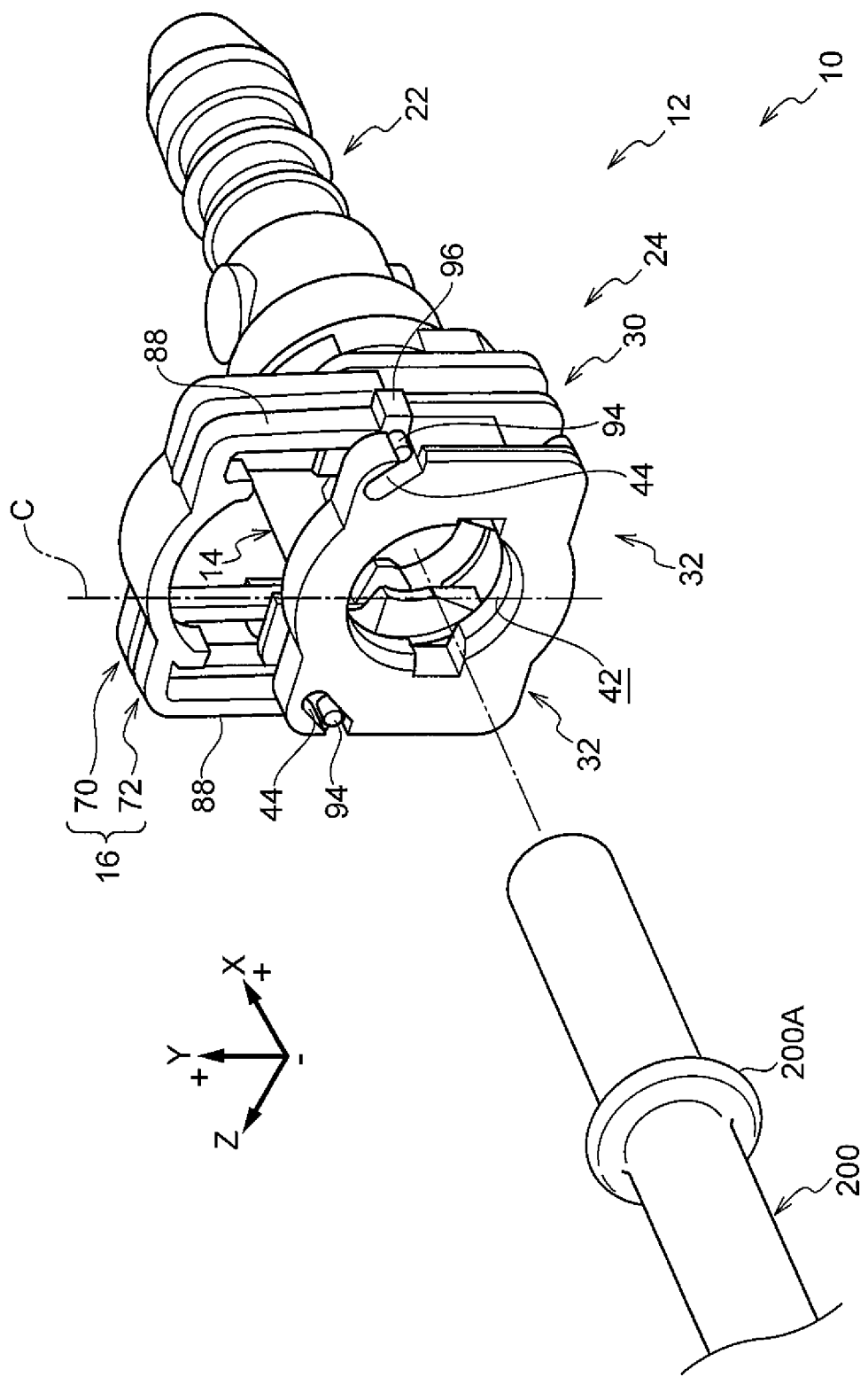
FIG. 3 is a perspective view showing, in the pipe connector pertaining to the first embodiment of the present invention, a state in which the confirmation member has been placed in a temporary fastening position.
Figure 4:
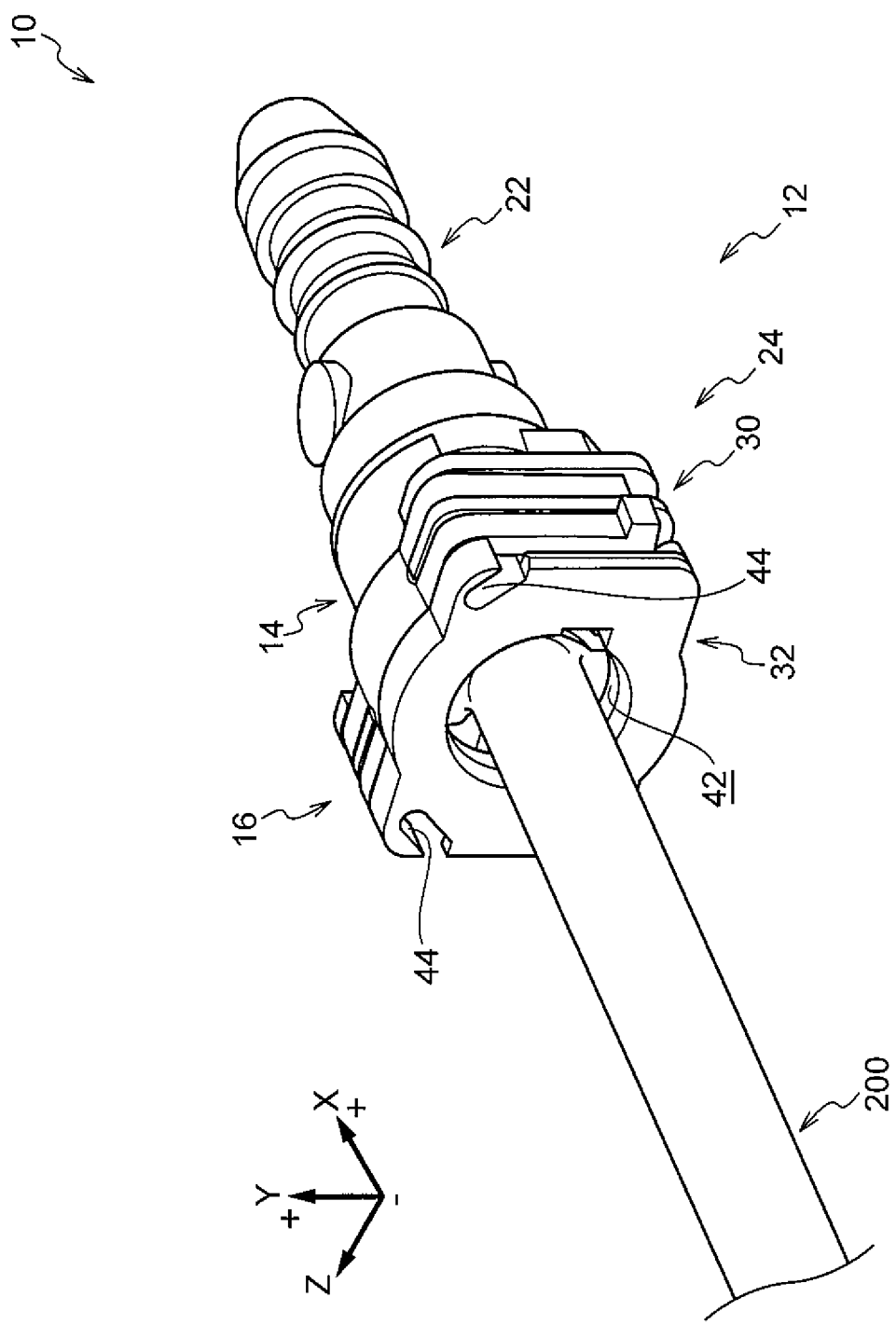
FIG. 4 is a perspective view showing, in the pipe connector pertaining to the first embodiment of the present invention, a state in which the confirmation member has been placed in an engagement confirmation position.

Furthermore, the pipe connector 10 is equipped with a confirmation member 16 serving as an example of a confirmation and release member that is placed in a temporary fastening position in which it is temporarily fastened to the housing 12 and the retainer 14 (see FIG. 3). The confirmation member 16 placed in the temporary fastening position can move toward the minus side (one side; the lower side in the drawings) in an intersecting direction (hereinafter called the "Y direction") intersecting (in the present embodiment, orthogonal to) the X direction when the pipe 200 is inserted into the insertion hole 20.

(Housing)

The housing 12 is integrally molded of a resin material. Moreover, the housing 12 is equipped with a tube segment 22, which extends in the X direction and in which is formed the insertion hole 20 into which the end portion of the pipe 200 is inserted, and an attachment segment 24, to which the retainer 14 is attached.

Figure 12A:
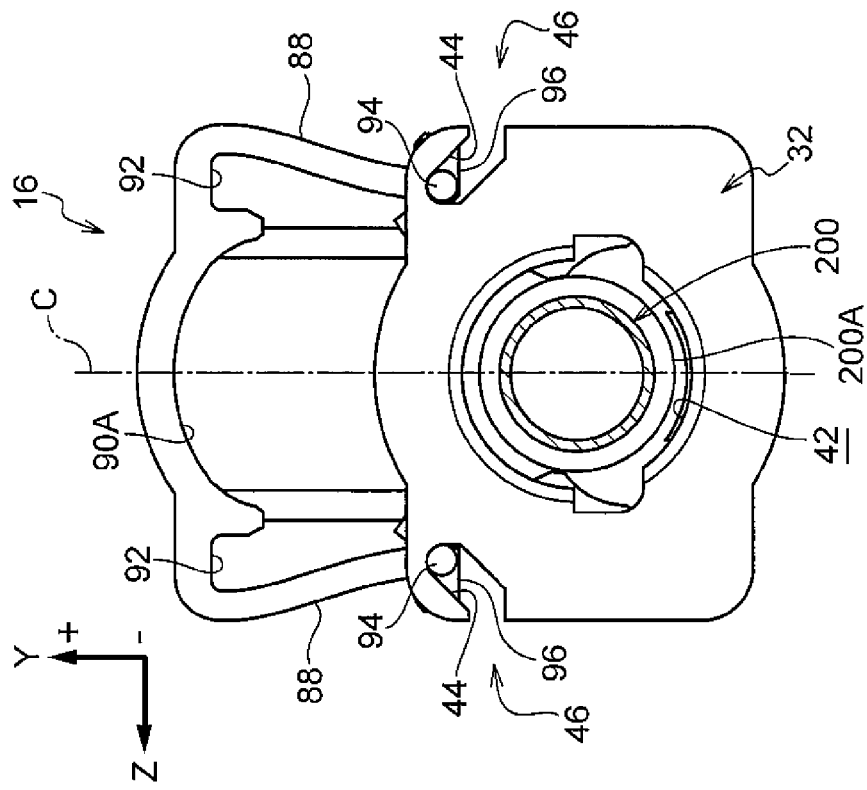
FIG. 12A is a back view showing, in the pipe connector pertaining to the first embodiment of the present invention, a state when lifting up the confirmation member from the temporary fastening position.
Figure 12B:
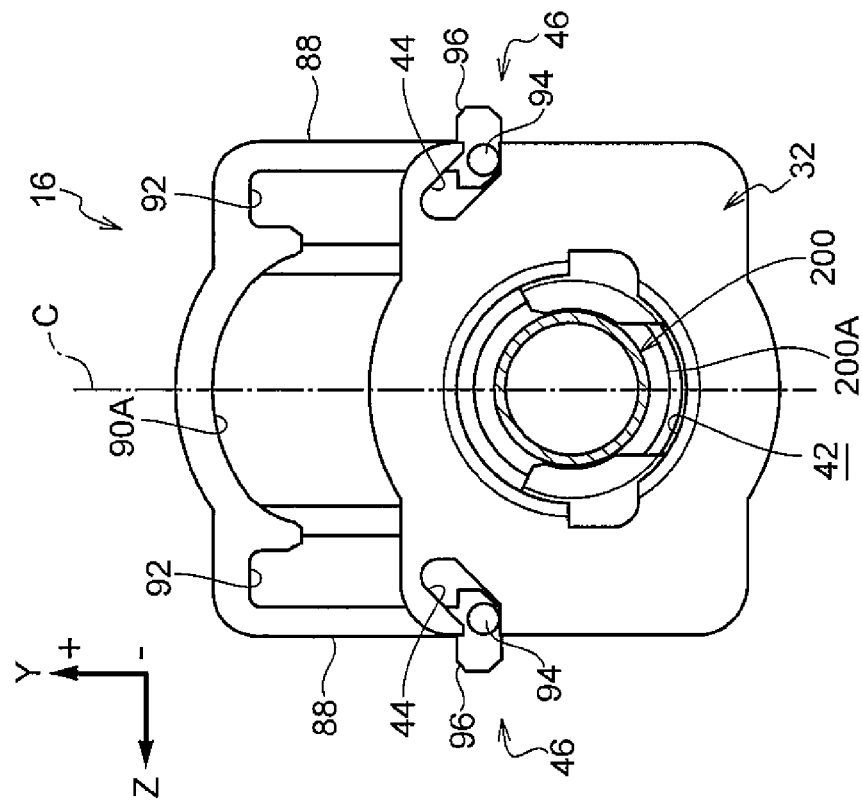
FIG. 12B is a back view showing, in the pipe connector pertaining to the first embodiment of the present invention, the state when lifting up the confirmation member from the temporary fastening position.

Furthermore, the housing 12 is formed symmetrical in relation to a centerline (line C shown in the drawings) that extends in the Y direction of the insertion hole 20 as seen from the X direction (see FIG. 12A and FIG. 12B).

{Tube Segment}

Figure 5:
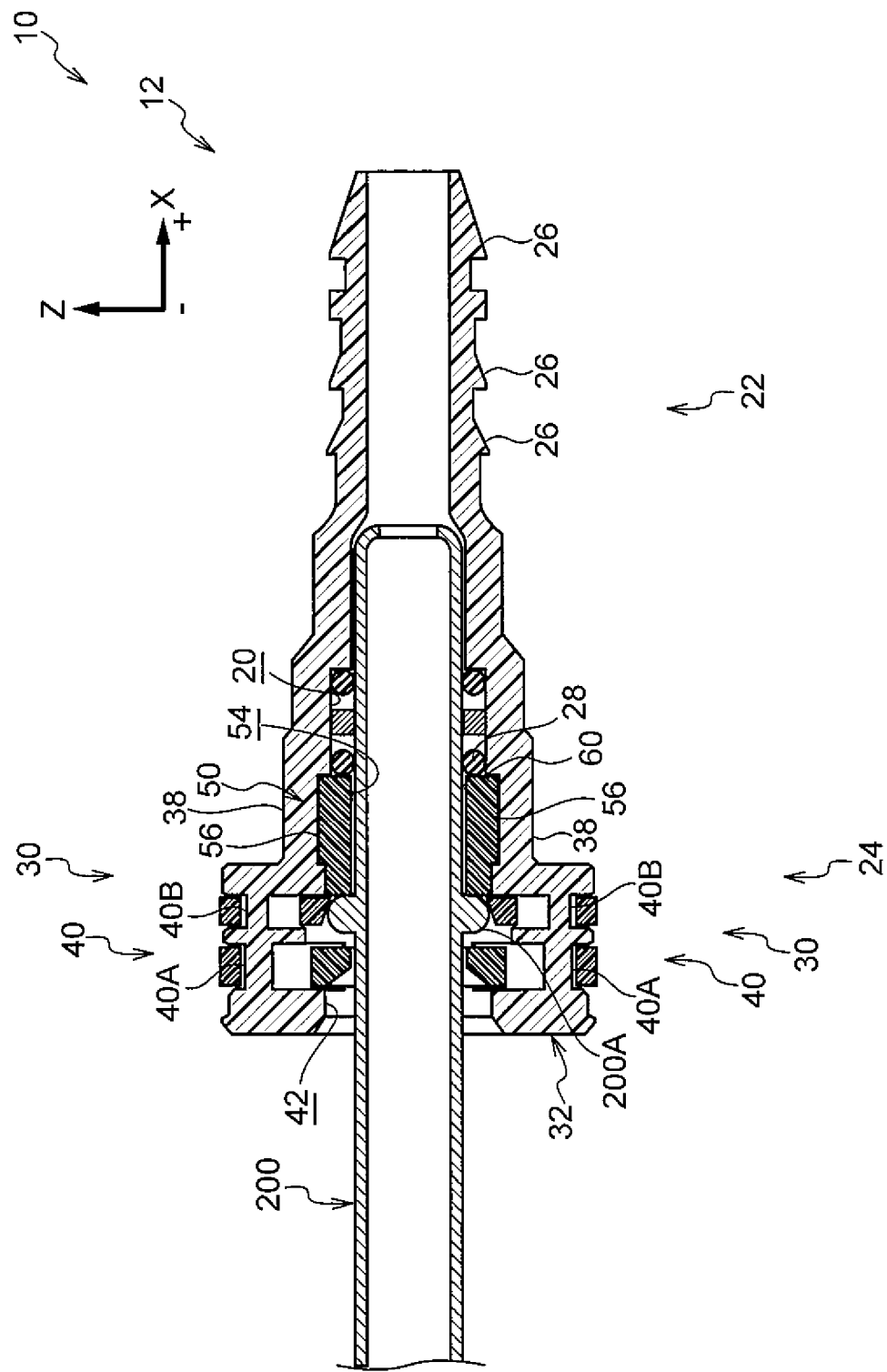
FIG. 5 is a cross-sectional view showing, in the pipe connector pertaining to the first embodiment of the present invention, a state in which a pipe has been inserted into an insertion hole.
Figure 6:
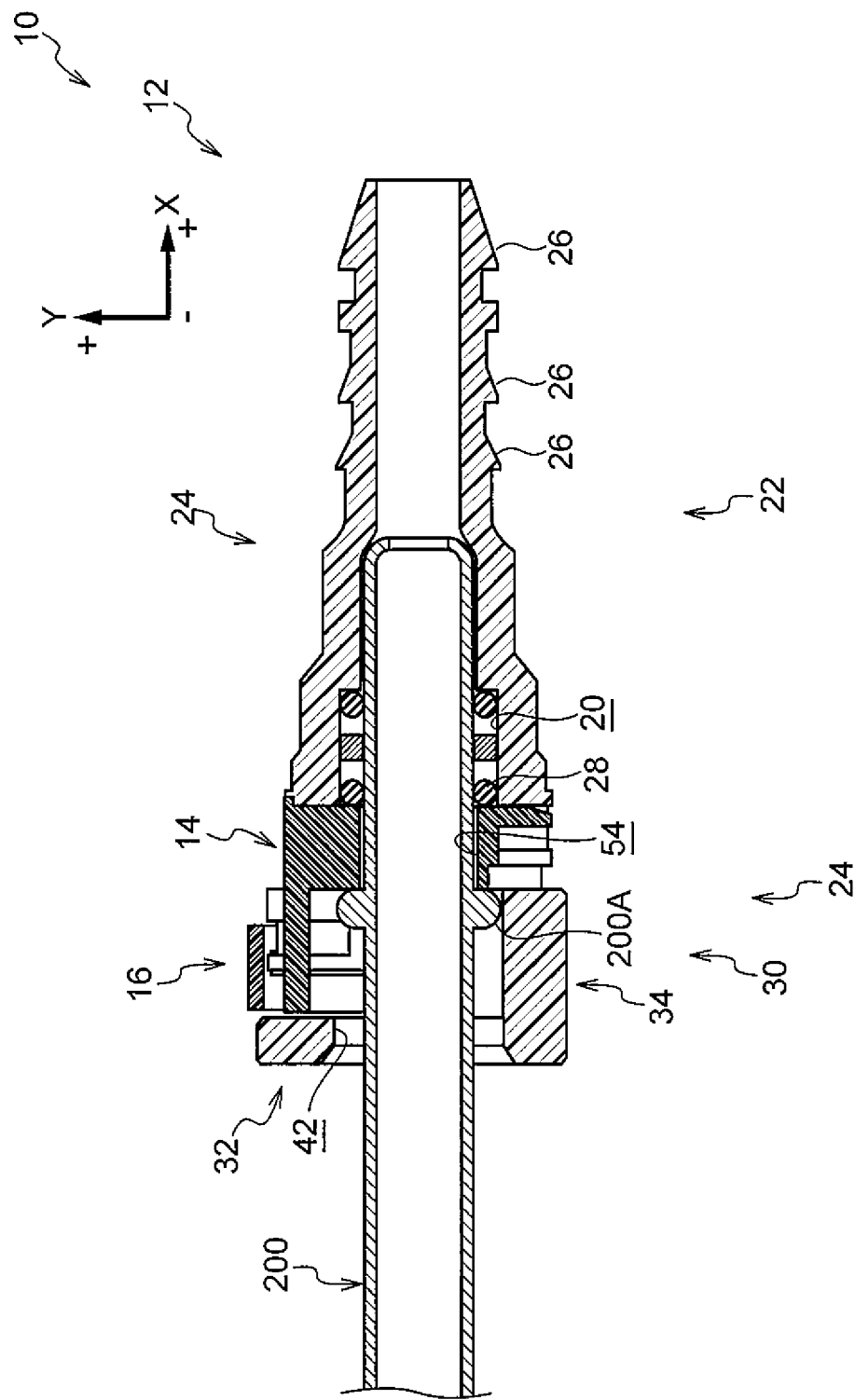
FIG. 6 is a cross-sectional view showing, in the pipe connector pertaining to the first embodiment of the present invention, the state in which the pipe has been inserted into the insertion hole.

As shown in FIG. 5 and FIG. 6, plural (in the present embodiment, three) tapered portions 26 whose X-direction plus sides are tapered are formed on the outer peripheral surface of the tube segment 22 on the plus side in the X direction (the right side in the drawings). Because of this, when the X-direction plus side of the tube segment 22 is inserted into the non-illustrated tube, the tube becomes secured to the tube segment 22. Furthermore, an O-ring (not illustrated in the drawings) that seals the space between the outer peripheral surface of the tube segment 22 and the inner peripheral surface of the tube in a state in which the tube has been secured to the tube segment 22 is placed on the outer peripheral surface of the tube segment 22.

The insertion hole 20 formed in the tube segment 22 becomes smaller in diameter in stages heading toward the plus side in the X direction. Furthermore, an O-ring 28 that is in contact with the outer peripheral surface of the pipe 200 inserted into the insertion hole 20 and seals the space between the inner peripheral surface of the insertion hole 20 and the outer peripheral surface of the pipe 200 is placed in the end portion of the insertion hole 20 on the minus side in the X direction (an insertion side into which the pipe 200 is inserted).

{Attachment Segment}

The attachment segment 24 is formed on the X-direction minus side of the tube segment 22.

As shown in FIG. 1, the interior of the attachment segment 24 opens toward the plus side in the Y direction (the upper side in FIG. 1) in such a way that the retainer 14 is attached to the attachment segment 24 by moving the retainer 14 from the outside of the housing 12 toward the minus side in the Y direction (the lower side in FIG. 1).

Specifically, the attachment segment 24 is equipped with a pair of side wall portions 30 that are spaced apart from one another in a width direction (hereinafter called the "Z direction") orthogonal to the X direction and the Y direction. Moreover, the attachment segment 24 is equipped with an opposing wall portion 32, which couples the X-direction minus sides of the pair of side wall portions 30 to one another and opposes the end portion of the insertion hole 20, and a bridge portion 34 (see FIG. 10), which bridges the Y-direction minus sides of the pair of side wall portions 30.

[Side Wall Portions]

As shown in FIG. 5, each of the side wall portions 30 is equipped with a panel-like side panel 38, which is placed on the plus side in the X direction and whose X-direction plus-side end portion is secured to the tube segment 22, and a rail portion 40, which is placed on the minus side in the X direction in relation to the side panel. The rail portions 40 are equipped with recessed-like rails 40A that extend in the Y direction and rails 40B that are placed on the plus side in the X direction in relation to the rails 40A.

[Opposing Wall Portion]

The opposing wall portion 32 has both of its Z-direction end portions secured to the rail portions 40 and, as shown in FIG. 12A and FIG. 12B, is substantially rectangular as seen from the X direction. Moreover, the opposing wall portion 32 is equipped with a through hole 42 that is concentric with the insertion hole 20.

Furthermore, a pair of guide grooves 44 spaced apart from one another in the Z direction are formed in the opposing wall portion 32 on the plus side in the Y direction in relation to the through hole 42.

The Z-direction outer sides of the pair of guide grooves 44 (the sides away from the insertion hole 20 as seen from the X direction) are open, and the pair of guide grooves 44 slope in relation to the Y direction in such a way that they become closer to one another heading toward the plus side in the Y direction.

[Bridge Portion]

The bridge portion 34 bridges the Y-direction minus sides of the pair of rail portions 40. As shown in FIG. 10, the bridge portion 34 is equipped with a block 48 surrounded by a circular arc surface 48A, which is concentric with the insertion hole 20 as seen from the X direction, and a pair of side surfaces 48B, which extend from both Z-direction end portions of the circular arc surface 48A toward the minus side in the Y direction and are spaced apart in the Z direction from the rail portions 40.

Additionally, top portions 48C configured by the circular arc surface 48A and the side surfaces 48B mesh with later-described recessed grooves 84A so that the confirmation member 16 is placed in the temporary fastening position (details described later).

(Retainer)

Figure 2:
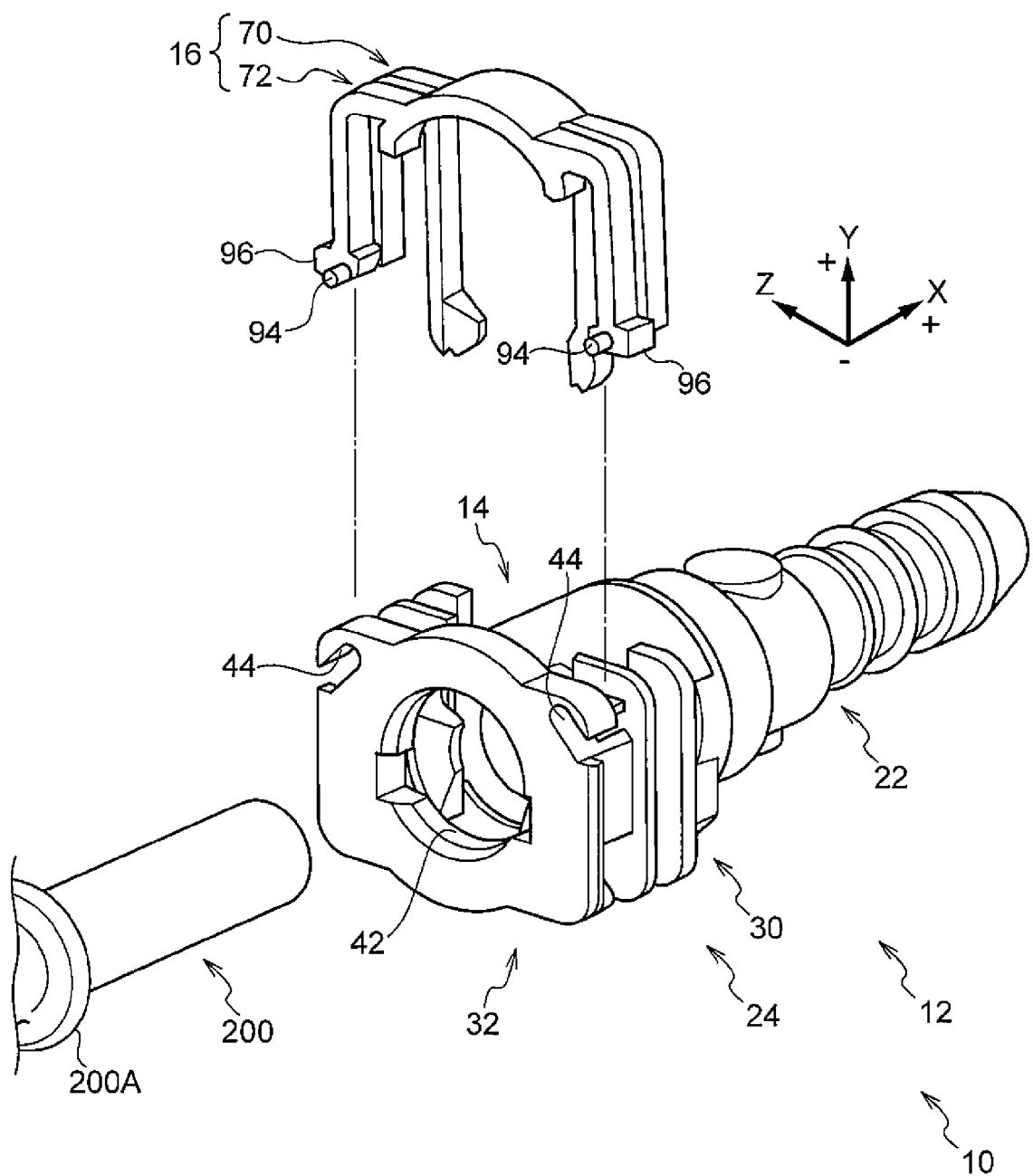
FIG. 2 is an exploded perspective view showing, in the pipe connector pertaining to the first embodiment of the present invention, a state in which a confirmation member has been detached.

As shown in FIG. 1 and FIG. 2, the retainer 14 is integrally molded of a resin material and, as mentioned above, is attached to the attachment segment 24 of the housing 12 from the outside of the housing 12 as a result of being moved toward the minus side in the Y direction. Furthermore, the retainer 14 is formed symmetrical in relation to the centerline (line C shown in the drawings) that extends in the Y direction of the insertion hole 20 as seen from the X direction.

Moreover, the retainer 14 has a regulation segment 50 that is formed on the plus side in the X direction and regulates the position, in the X direction, of the O-ring 28 (see FIG. 5) placed in the insertion hole 20. Furthermore, the retainer 14 has a prevention segment 52 that engages with the spool 200A of the pipe 200 having the end portion inserted into the insertion hole 20 and prevents the pipe 200 from being removed from the insertion hole 20.

Additionally, in a state in which the retainer 14 has been attached to the attachment segment 24, the retainer 14 is sandwiched between the opposing wall portion 32 and the tube segment 22 in the X direction as shown in FIG. 6.

{Regulation Segment}

As shown in FIG. 5, the regulation segment 50 is equipped with a regulation surface 60 that faces the plus side in the X direction, is in contact with the O-ring 28 placed in the insertion hole 20 in the X direction, and regulates movement of the O-ring 28 toward the minus side in the X direction. Moreover, the regulation segment 50 is equipped with a pass-through hole 54 through which the pipe 200 inserted into the insertion hole 20 passes.

Figure 7:
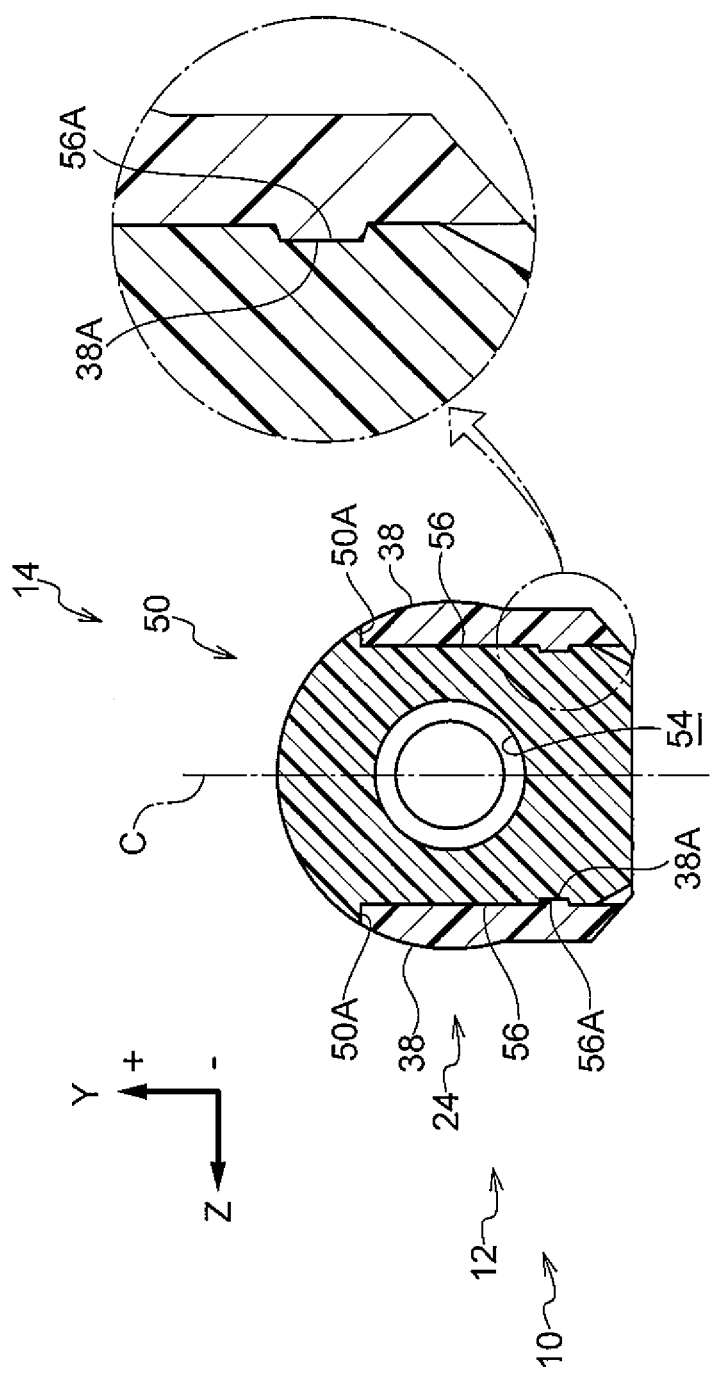
FIG. 7 is a cross-sectional view showing, in the pipe connector pertaining to the first embodiment of the present invention, a state of attachment between a housing and a retainer.

Furthermore, as shown in FIG. 7, the regulation segment 50 is sandwiched between the pair of side panels 38 of the attachment segment 24 in a state in which the retainer 14 has been attached to the attachment segment 24 of the housing 12.

Moreover, recessed-like recessed portions 56A are formed in a pair of side surfaces 56 of the regulation segment 50 that face outward in the Z direction, and in a state in which the retainer 14 has been attached to the attachment segment 24 the recessed portions 56A mesh with projections 38A formed on the side panels 38. In this way, because the recessed portions 56A and the projections 38A mesh with one another, movement, toward the plus side in the Y direction, of the retainer 14 attached to the attachment segment 24 is regulated (the attached state of the retainer 14 is maintained).

Furthermore, projections 50A that project outward in the Z direction are formed on the Y-direction plus side of the regulation segment 50, and in a state in which the retainer 14 has been attached to the attachment segment 24 the projections 50A strike the Y-direction plus-side end surfaces of the side panels 38 from the plus side in the Y direction. In this way, because the projections 50A strike the side panels 38 from the plus side in the Y direction, movement, toward the minus side in the Y direction, of the retainer 14 attached to the attachment segment 24 is regulated (the attached state of the retainer 14 is maintained).

Figure 8:
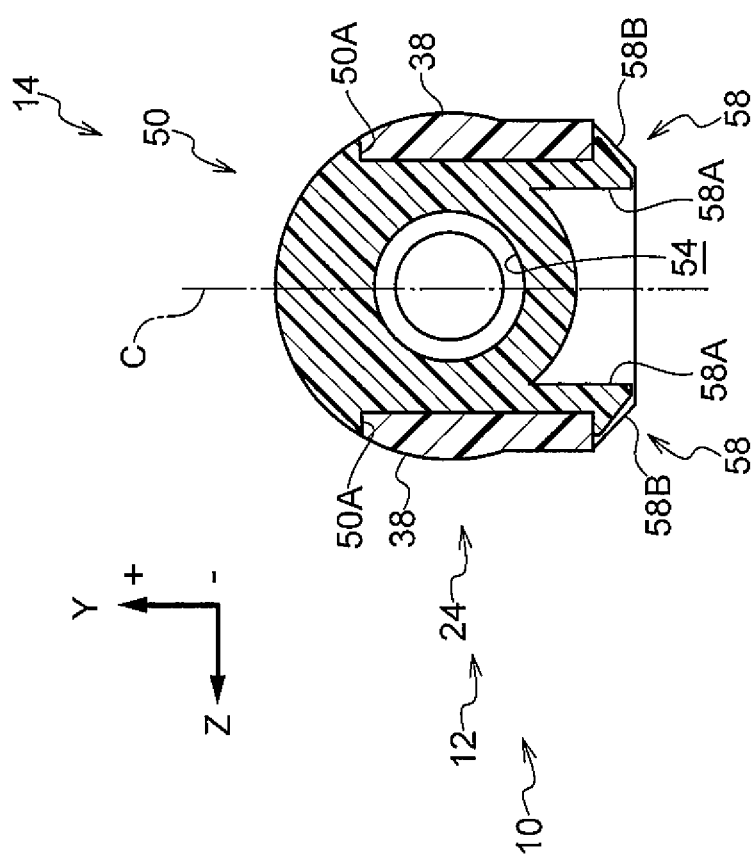
FIG. 8 is a cross-sectional view showing, in the pipe connector pertaining to the first embodiment of the present invention, the state of attachment between the housing and the retainer.

Furthermore, as shown in FIG. 1, the regulation segment 50 is equipped with hook portions 58 placed on the minus side in the X direction in relation to the recessed portions 56A. As shown in FIG. 8, the hook portions 58 are equipped with support bars 58A, which extend in the Y direction and whose Y-direction minus sides are free ends, and projections 58B, which are formed on the Y-direction minus side of the support bars 58A and project outward in the Z direction.

Additionally, in a state in which the retainer 14 has been attached to the housing 12 the projections 58B are hooked on the end edges of the side panels 38. Because of this, movement, toward the plus side in the Y direction, of the retainer 14 attached to the attachment segment 24 is regulated even more (the attached state of the retainer 14 is maintained).

{Prevention Segment}

As shown in FIG. 1, the prevention segment 52 is placed on the minus side in the X direction in relation to the regulation segment 50, and the Y-direction plus side of the prevention segment 52 and the Y-direction plus side of the regulation segment 50 are coupled to one another.

Additionally, the prevention segment 52 is equipped with an engagement portion 62, which serves as an example of an engagement segment that engages with the spool 200A from outside in the radial direction of the pipe 200 inserted into the insertion hole 20, and projecting portions 64, which serve as an example of projecting segments that project outward in the radial direction of the pipe 200 from the engagement portion 62.

[Engagement Portion]

Figure 9A:
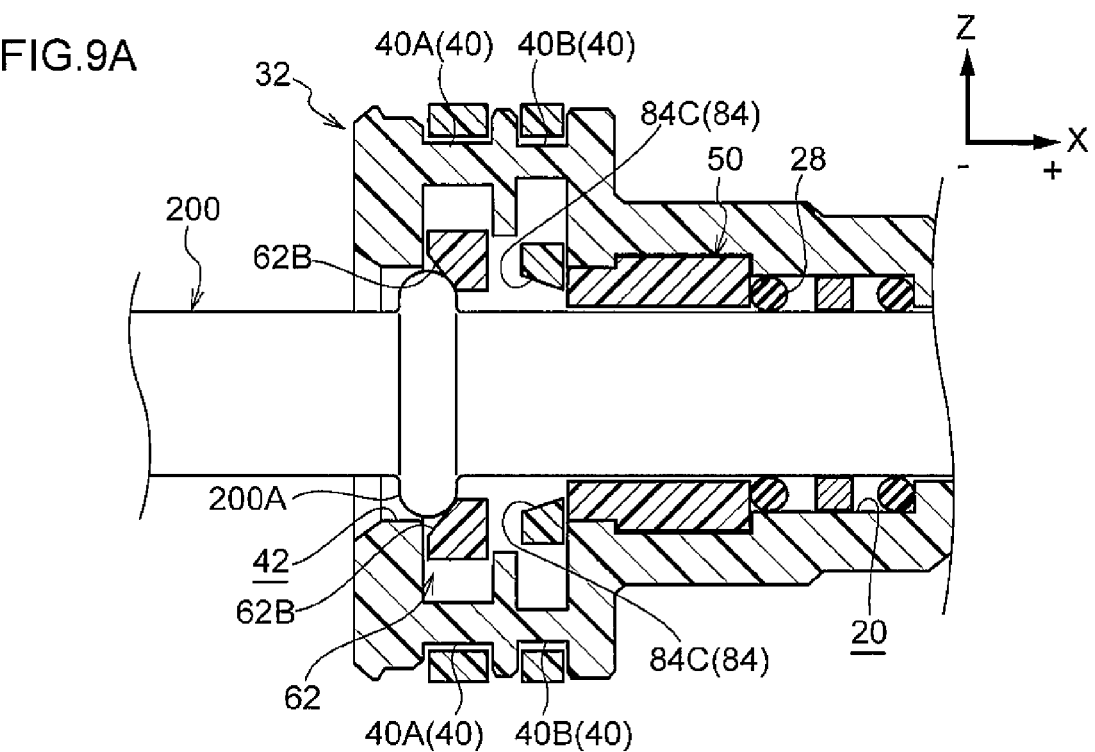
FIG. 9A is a cross-sectional view showing, in the pipe connector pertaining to the first embodiment of the present invention, a state when the pipe is inserted into the insertion hole.
Figure 13:
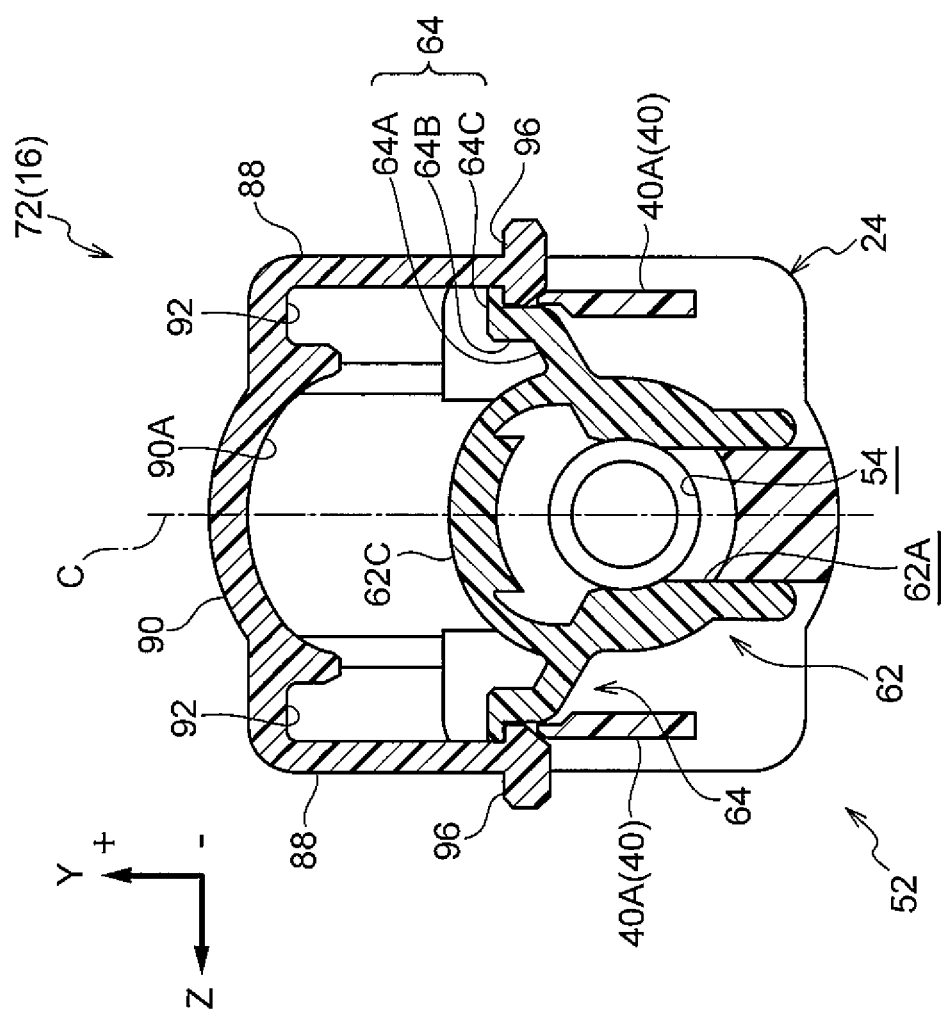
FIG. 13 is a cross-sectional view showing, in the pipe connector pertaining to the first embodiment of the present invention, the state in which the confirmation member has been placed in the temporary fastening position.

As shown in FIG. 13, the engagement portion 62 is given an annular, curved shape (curved shape) in which an opening 62A, part of whose Y-direction minus side is separated, is formed. Moreover, as shown in FIG. 9A and FIG. 9B, a pair of tapered surfaces 62B that become pushed by the spool 200A of the pipe 200 when the pipe 200 is inserted into the insertion hole 20 are formed in the engagement portion 62.

The tapered surfaces 62B slope in such a way as to slant inward in the Z direction (the side approaching the insertion hole 20 as seen from the X direction) heading toward the plus side in the X direction. Because of this, when the spool 200A of the pipe 200 pushes the tapered surfaces 62B toward the plus side in the X direction when the pipe 200 is inserted into the insertion hole 20, the engagement portion 62 becomes elastically deformed in such a way that the opening 62A (see FIG. 13) expands.

Figure 9B:
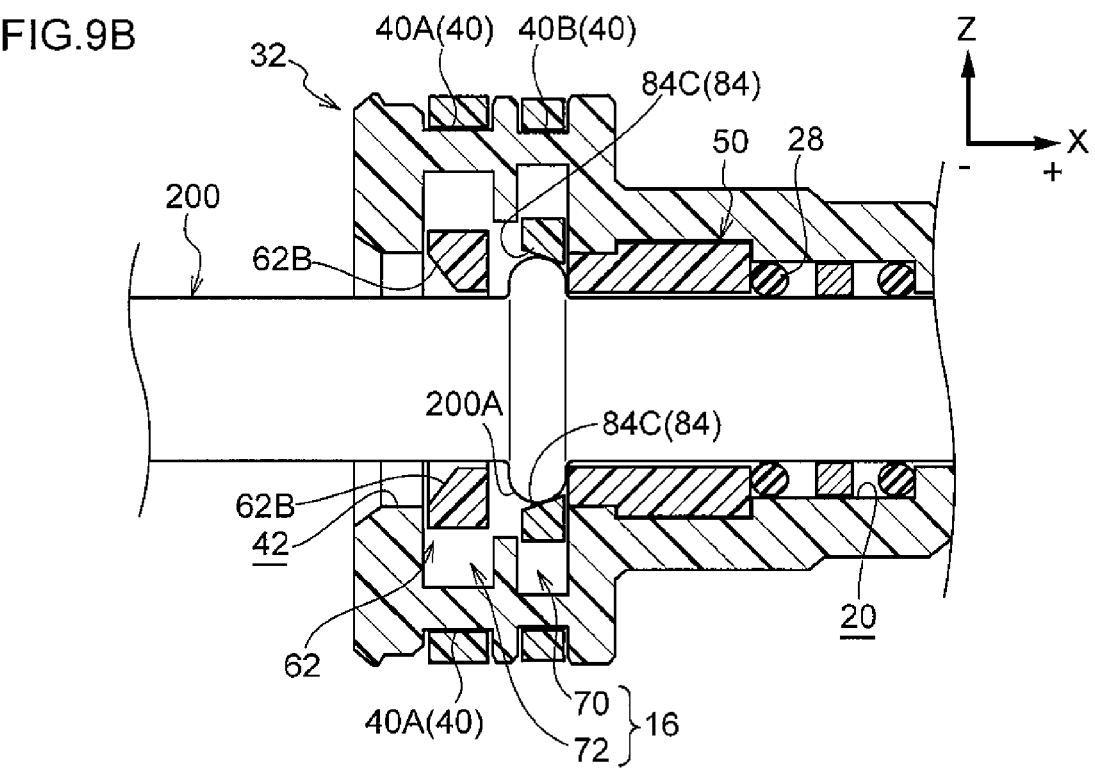
FIG. 9B is a cross-sectional view showing, in the pipe connector pertaining to the first embodiment of the present invention, the state when the pipe is inserted into the insertion hole.

Additionally, movement of the spool 200A toward the plus side in the X direction is allowed, and, as shown in FIG. 9B, the spool 200A that has moved toward the plus side in the X direction strikes the end surface of the regulation segment 50 and stops. In this state, the engagement portion 62 elastically returns to its original state and engages with the spool 200A (engaged state) so that removal of the pipe 200 from the insertion hole 200 is prevented.

[Projecting Portions]

As for the projecting portions 64, as shown in FIG. 13, two (a pair) are formed in such a way as to project from the outer peripheral surface of the engagement portion 62 outward in the radial direction of the pipe 200 inserted into the insertion hole 20.

The pair of projecting portions 64 are formed symmetrical in relation to the centerline C as seen from the X direction. Each of the projecting portions 64 is equipped with a sloping part 64A that slopes in such a way that its distal end is placed on the plus side in the Y direction in relation to the Z direction, a middle part 64B that extends from the distal end of the sloping part 64A toward the plus side in the Y direction, and a projection 64C that extends from the distal end of the middle part 64B outward in the Z direction.

(Confirmation Member)

The confirmation member 16 is integrally molded of a resin material and is formed symmetrical in relation to the centerline C as seen from the X direction. Furthermore, the pipe connector 10 is shipped in a state in which the confirmation member 16 has been placed in a temporary fastening position in which it is temporarily fastened to the housing 12 and the retainer 14 (see FIG. 3). It should be noted that the temporary fastening position will be described in detail later.

Moreover, the confirmation member 16 is equipped with a confirmation segment 70 which, in a state in which the confirmation member 16 has been placed in the temporary fastening position, as shown in FIG. 3, strikes the spool 200A in the engaged state and allows movement of the confirmation member 16 toward the minus side in the Y direction (see FIG. 9B). Furthermore, the confirmation member 16 is equipped with a release segment 72 which, when the confirmation member 16 is moved from the temporary fastening position toward the plus side in the Y direction, deforms the engagement portion 62 of the retainer 14 and releases the engagement between the engagement portion 62 and the spool 200A (see FIG. 15B). The release segment 72 is placed on the minus side in the X direction in relation to the confirmation segment 70, and the release segment 72 and the confirmation segment 70 are coupled to one another at their Y-direction plus sides.

{Confirmation Segment}

As shown in FIG. 10, the confirmation segment 70 is equipped with a pair of guide portions 76 that extend in the Y direction, fit together with the rails 40B, are guided in the Y direction, and whose Y-direction minus sides are free ends. Furthermore, the confirmation segment 70 is equipped with a bridge portion 78 that bridges the Y-direction plus sides of the pair of guide portions 76.

Moreover, the confirmation segment 16 is equipped with a pair of confirmation portions 80 placed inside in the Z direction in relation to the guide portions 76. Each of the confirmation portions 80 is equipped with an extension part 82, whose base end portion is secured to the bridge portion 78 and which extends toward the minus side in the Y direction, and a distal end part 84, which is formed on the distal end of the extension part 82 and is made wide inward in the Z direction in relation to the extension part 82.

Recessed grooves 84A are formed in the Y-direction minus-side end portions of the distal end parts 84, and in a state in which the confirmation member 16 has been placed in the temporary fastening position the top portions 48C of the bridge portion 34 mentioned above fit together with the recessed grooves 84A in the Y direction. Because of this, movement, toward the minus side in the Y direction, of the confirmation member 16 placed in the temporary fastening position is regulated.

Furthermore, sloping surfaces 84B that slope toward the plus side in the Y direction are formed inside in the Z direction in relation to the recessed grooves 84A in the distal end parts 84 as seen from the X direction.

Furthermore, as shown in FIG. 9B, tapered surfaces 84C pushed by the spool 200A in the engaged state with the engagement portion 62 are formed on the distal end parts 84. The tapered surfaces 84C slope in such a way as to slant inward in the Z direction heading toward the plus side in the X direction.

Because of this, when the pipe 200 is inserted into the insertion hole 20 and the spool 200A and the engagement portion 62 become engaged with one another, the spool 200A pushes the tapered surfaces 84C so that, as shown in FIG. 11A, the free end portions of the extension parts 82 become elastically deformed outward in the Z direction. Then, the mating between the recessed grooves 84A and the top portions 48C is released, and movement, toward the minus side in the Y direction, of the confirmation member 16 placed in the temporary fastening position, becomes possible.

In other words, the state in which the confirmation member 16 has been placed in the temporary fastening position is a state in which the pipe 200 can be inserted into the insertion hole 20 so that the engagement portion 62 can become engaged with the spool 200A, and is a state in which movement of the confirmation member 16 toward the minus side in the Y direction is regulated. This is a so-called delivery state (initial state) of the pipe connector 10.

{Release Segment}

As shown in FIG. 13, the release segment 72 is equipped with a pair of guide portions 88, which extend in the Y direction, fit together with the rails 40A, are guided in the Y direction, and whose Y-direction minus sides are free ends, and a bridge portion 90, which bridges the Y-direction plus sides of the pair of guide portions 88. The bridge portion 90 is coupled in the X direction to the bridge portion 78 of the confirmation segment 70 (see FIG. 10).

Distal end portions 96 serving as an example of pull-up segments that project inward in the Z direction and outward in the Z direction in relation to the guide portions 88 are formed on the distal ends of the guide portions 88. In a state in which the confirmation member 16 has been placed in the temporary fastening position, the sections of the distal end portions 96 projecting inward in the Z direction are in contact with the projections 64C of the prevention segment 52 from the minus side in the Y direction. Because of this, movement, toward the plus side in the Y direction, of the confirmation member 16 placed in the temporary fastening position is regulated. Furthermore, the sections of the distal end portions 96 projecting outward in the Z direction project outward in the Z direction from the attachment segment 24 as seen from the X direction (see FIG. 12A).

Figure 14A:
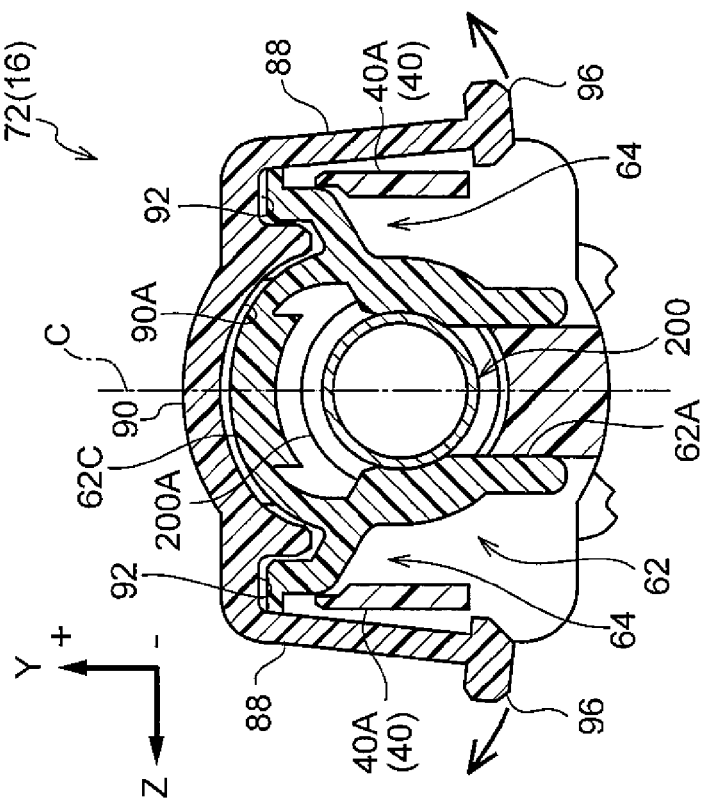
FIG. 14A is a cross-sectional view showing, in the pipe connector pertaining to the first embodiment of the present invention, a state when releasing the catching between distal end portions of the confirmation member placed in the engagement confirmation position and lower ends of rails.

As mentioned above, the spool 200A and the engagement portion 62 become engaged with one another, and movement, toward the minus side in the Y direction, of the confirmation member 16 in which the mating between the recessed grooves 84A and the top portions 48C has been released becomes possible (see FIG. 11A). Therefore, when the confirmation member 16 is moved toward the minus side in the Y direction, as shown in FIG. 14A, an inner peripheral surface 90A (an example of a determent curved surface) of the bridge portion 90 and an outer peripheral surface 62C of the engagement portion 62 come into surface contact with one another in the Y direction. Additionally, the confirmation member 16 becomes placed in an engagement confirmation position (see FIG. 4).

Furthermore, the release segment 72 is equipped with two recessed portions 92 serving as an example of recessed segments that hold the middle parts 64B and the projections 64C of the projecting portions 64 in a state in which the confirmation member 16 has been placed in the engagement confirmation position.

Moreover, in a state in which the confirmation member 16 has been placed in the engagement confirmation position, the sections of the distal end portions 96 projecting inward in the Z direction are caught on the lower ends of the rails 40A.

By moving toward the plus side in the Y direction the confirmation member 16 placed in the engagement confirmation position, the confirmation member 16 is placed in the temporary fastening position (see FIG. 15A). Moreover, when the confirmation member 16 placed in the temporary fastening position is moved toward the plus side in the Y direction, as shown in FIG. 15B, the distal end portions 96 pull up the projecting portions 64 toward the plus side in the Y direction.

At this time, as shown in FIG. 3, the circular projections 94 used to regulate movement of the distal end portions 96 project from the distal end portions 96 toward the minus side in the X direction and are placed inside the guide grooves 44 formed in the opposing wall portion 32 (see FIG. 12A).

Because of this configuration, in a state in which the confirmation member 16 has been placed in the temporary fastening position, one pushes inward in the Z direction the sections of the distal end portions 96 projecting outward in the Z direction or lifts up the confirmation member 16 toward the plus side in the Y direction. When one does so, as shown in FIG. 12A and FIG. 12B, the projections 94 move from one end to the other end of the guide grooves 44. Because of this, movement of the distal end portions 96 is regulated. Additionally, the distal end portions 96 lift up the projecting portions 64 toward the plus side in the Y direction, and, as shown in FIG. 15B, the opening 62A in the engagement portion 62 expands so that the engagement between the spool 200A and the engagement portion 62 is released.

Due to the above, guide segments 46 that guide the projecting portions 64 in such a way that the opening 62A in the engagement portion 62 expands when the confirmation member 16 is moved toward the plus side in the Y direction are configured from the guide grooves 44 and the projections 94 (see FIG. 12A and FIG. 12B).

(Action)

Next, the action of the pipe connector 10 pertaining to the first embodiment will be described, divided between pipe insertion work, confirmation work, and pipe removal work. It should be noted that the pipe insertion work is work for attaching the pipe 200 to the pipe connector 10, the confirmation work is work for confirming that the pipe 200 is attached to the pipe connector 10, and the pipe removal work is work for detaching the pipe 200 from the pipe connector 10.

{Pipe Insertion Work}

In the pipe insertion work, as shown in FIG. 3, the confirmation member 16 of the pipe connector 10 is placed in the temporary fastening position in which it is temporarily fastened to the housing 12 and the retainer 14. Then, the tube (not shown in the drawings) is attached to the outer peripheral surface of the tube segment 22 of the pipe connector 10.

In a state in which the confirmation member 16 has been placed in the temporary fastening position, as shown in FIG. 10, the recessed grooves 84A in the confirmation portions 80 and the top portions 48C of the bridge portion 34 mate with one another. Because of this, movement of the confirmation member 16 toward the minus side in the Y direction is regulated. Moreover, as shown in FIG. 13, the Z-direction inside sections of the distal end portions 96 of the release segment 72 are in contact with the projections 64C from the minus side in the Y direction, and movement of the confirmation member 16 toward the plus side in the Y direction is regulated.

In this state, first, the end portion of the pipe 200 is passed through the through hole 42 in the opposing wall portion 32 and the pass-through hole 54 in the regulation segment 50 and is inserted into the insertion hole 20.

When the end portion of the pipe 200 is inserted into the insertion hole 20, as shown in FIG. 9A, the spool 200A of the pipe 200 comes into contact with the tapered surfaces 62B of the engagement portion 62 from the minus side in the X direction. Moreover, when the pipe 200 is moved toward the plus side in the X direction, the spool 200A pushes the tapered surfaces 62B toward the plus side in the X direction, and thus the engagement portion 62 becomes elastically deformed in such a way that the opening 62A (see FIG. 13) expands.

Additionally, movement of the spool 200A toward the plus side in the X direction is allowed, and when the pipe 200 is further moved toward the plus side in the X direction, as shown in FIG. 9B, the spool 200A pushes the tapered surfaces 84C of the confirmation portions 80 toward the plus side in the X direction. Because of this, as shown in FIG. 11A, the free ends of the extension parts 82 become elastically deformed outward in the Z direction. Additionally, the mating between the recessed grooves 84A and the top portions 48C is released, and movement, toward the minus side in the Y direction, of the confirmation member 16 placed in the temporary fastening position becomes possible. The spool 200A that has moved toward the plus side in the X direction strikes the end surface of the regulation segment 50 and stops (see FIG. 9B). In this state, as shown in FIG. 9B, the engagement portion 62 elastically returns to its original state and engages with the spool 200A (engaged state) so that removal of the pipe 200 from the insertion hole 20 is prevented.

Furthermore, in this engaged state, the O-ring 28 placed in the insertion hole 20 is in contact with the outer peripheral surface of the pipe 200 inserted into the insertion hole 20, so that the space between the inner peripheral surface of the insertion hole 20 and the outer peripheral surface of the pipe 200 is sealed.

In this way, the pipe 200 is inserted into the insertion hole 20 and attached to the pipe connector 10, so that the flow path in the pipe 200 and the flow path in the tube become communicated with one another.

{Confirmation Work}

The confirmation work is, as mentioned above, work for confirming that the pipe 200 is attached to the pipe connector 10, or in other words work for confirming that the spool 200A and the engagement portion 62 are in an engaged state.

As mentioned above, in the engaged state between the spool 200A and the engagement portion 62, as shown in FIG. 11A, the mating between the recessed grooves 84A in the confirmation portions 80 and the top portions 48C of the bridge portion 34 is released, and movement, toward the minus side in the Y direction, of the confirmation member 16 that had been placed in the temporary fastening position becomes possible.

Additionally, when the confirmation member 16 is moved toward the minus side in the Y direction, as shown in FIG. 11B and FIG. 14A, the inner peripheral surface 90A of the bridge portion 90 and the outer peripheral surface 62C of the engagement portion 62 come into surface contact with one another in the Y direction, and movement of the confirmation member 16 toward the minus side in the Y direction is regulated. Because of this, the confirmation member 16 is placed in the engagement confirmation position.

Furthermore, when the confirmation member 16 is placed in the engagement confirmation position, as shown in FIG. 14A, the recessed portions 92 formed in the release segment 72 hold the middle parts 64B and the projections 64C of the projecting portions 64. Moreover, the sections of the distal end portions 96 projecting inward in the Z direction become caught on the lower ends of the rails 40A. Because of this, movement of the confirmation member 16 toward the plus side in the Y direction is regulated.

In this way, by moving the confirmation member 16 to the engagement confirmation position, the engaged state between the spool 200A and the engagement portion 62 is confirmed.

{Pipe Removal Work}

The pipe removal work is, as mentioned above, work for detaching the pipe 200 from the pipe connector 10.

Figure 14B:
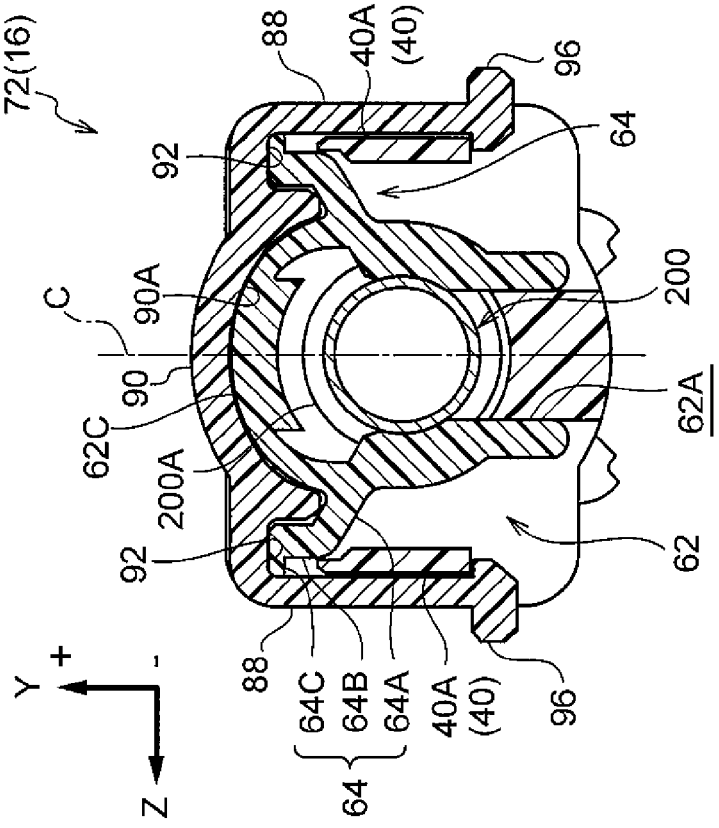
FIG. 14B is a cross-sectional view showing, in the pipe connector pertaining to the first embodiment of the present invention, the state when releasing the catching between the distal end portions of the confirmation member placed in the engagement confirmation position and the lower ends of the rails.

In the case of detaching the pipe 200 from the pipe connector 10 from the state in which the confirmation member 16 has been placed in the engagement confirmation position, first, as shown in FIG. 14B, one uses the sections of the distal end portions 96 projecting outward in the Z direction to spread the distal end portions 96 outward in the Z direction. Because of this, the catching between the sections of the distal end portions 96 projecting inward in the Z direction and the lower ends of the rails 40A is released.

In a state in which the catching between the distal end portions 96 and the lower ends of the rails 40A has been released, one moves the confirmation member 16 toward the plus side in the Y direction and, as shown in FIG. 15A, moves the confirmation member 16 to the temporary fastening position.

Then, in a state in which the confirmation member 16 has been placed in the temporary fastening position, one pushes inward in the Z direction the sections of the distal end portions 96 projecting outward in the Z direction or lifts up the confirmation member 16 toward the plus side in the Y direction. When one does so, as shown in FIG. 12A and FIG. 12B, the projections 94 move from one end to the other end of the guide grooves 44. Because of this, as shown in FIG. 15B, the distal end portions 96 pull up the projecting portions 64 toward the plus side in the Y direction, and thus the opening 62A in the engagement portion 62 expands (see the arrows in the drawing) so that the engagement between the spool 200A and the engagement portion 62 is released.

Moreover, when one moves the pipe 200 toward the minus side in the X direction in a state in which the engagement between the spool 200A and the engagement portion 62 has been released, the end portion of the pipe 200 is removed from the insertion hole 20 and the pipe 200 is detached from the pipe connector 10.

After one has detached the pipe 20 from the pipe connector 10, one releases the pushing force (an example of holding force) on the sections of the distal end portions 96 projecting outward in the Z direction or the lift-up force (an example of holding force) lifting up the confirmation member 16 toward the plus side in the Y direction. When one does so, as shown in FIG. 10 and FIG. 13, the engagement portion 62 elastically returns to its original state and the confirmation member 16 moves to (is placed in) the temporary fastening position.

(Effects)

Next, the effects of the pipe connector 10 pertaining to the first embodiment will be described.

In the pipe connector 10 pertaining to the first embodiment, the retainer 14 is, as shown in FIG. 1, equipped with the regulation segment 50 that regulates the position of the O-ring 28 (see FIG. 5) placed in the insertion hole 20. Furthermore, the retainer 14 is equipped with the prevention segment 52 that engages with the spool 200A of the pipe 200 and prevents the pipe 200 from being removed from the insertion hole 20. Moreover, by moving the retainer 14 toward the minus side in the Y direction and attaching the retainer 14 to the attachment segment 24, the retainer 14 becomes sandwiched between the opposing wall portion 32 and the tube segment 22 as shown in FIG. 6. In other words, movement of the retainer 14 in the X direction is regulated by the opposing wall portion 32 and the tube segment 22.

Because of this, the number of parts can be reduced and the retainer 14 that regulates the position of the O-ring 28 can be prevented from being moved in the X direction by the pressure of fluid flowing inside the pipe connector 10 in the X direction.

Furthermore, the retainer 14 is integrally molded of a resin material. For this reason, the retainer 14 can be given an expensive configuration compared to a case where the retainer is configured by combining plural members. Furthermore, by devising the shape of the retainer 14, undercuts can be eliminated and a simple mold structure can be used.

Furthermore, in the confirmation work mentioned above, when the engagement member 16 is placed in the engagement confirmation position, the inner peripheral surface 90A of the bridge portion 90 and the outer peripheral surface 62C of the engagement portion 62 come into surface contact with one another. Because of this, deformation of the engagement portion 62 where the opening 62A in the engagement portion 62 expands is deterred, which prevents the engagement between the spool 200A and the engagement portion 62 from being released. In other words, the holding force when the pipe connector 10 holds the pipe 200 can be improved using the confirmation member 16 for confirming the engagement between the spool 200A of the pipe 200 and the engagement portion 62.

Furthermore, in the confirmation work mentioned above, when the confirmation member 16 is placed in the engagement confirmation position, the recessed portions 92 formed in the release segment 72 hold the middle parts 64B and the projections 64C of the projecting portions 64. Because of this, deformation of the engagement portion 62 where the opening 62A of the engagement portion 62 expands is deterred, which prevents the engagement between the spool 200A and the engagement portion 62 from being released. In this way, the engagement between the spool 200A and the engagement portion 62 can be effectively prevented from being released.

Furthermore, in the confirmation work mentioned above, when the confirmation member 16 is placed in the engagement confirmation position, the sections of the distal end portions 96 projecting inward in the Z direction become caught on the lower ends of the rails 40A. Additionally, movement of the confirmation member 16 toward the plus side in the Y direction is regulated. Because of this, the confirmation member 16 placed in the engagement confirmation position can be prevented from unintentionally moving toward the plus side in the Y direction, which prevents the holding force when the pipe connector 10 holds the pipe 200 from dropping.

Furthermore, in the pipe removal work mentioned above, one pushes inward in the Z direction the sections of the distal end portions 96 of the confirmation member 16 projecting outward in the Z direction or lifts up the confirmation member 16 toward the plus side in the Y direction. When one does so, as shown in FIG. 12A and FIG. 12B, the projections 94 move from one end to the other end of the guide grooves 44. Because of this, as shown in FIG. 15B, the distal end portions 96 pull up the projecting portions 64 toward the plus side in the Y direction, the opening 62A in the engagement portion 62 expands, and the engagement between the spool 200A and the engagement portion 62 is released. In this way, the engagement between the spool 200A of the pipe 200 and the engagement portion 62 can be released using the confirmation member 16 for confirming the engagement between the spool 200A of the pipe 200 and the engagement portion 62. In other words, the engagement between the spool 200A and the engagement portion 62 can be released with a simple configuration and without having to use a dedicated tool.

Furthermore, in the pipe removal work mentioned above, one pushes inward in the Z direction the sections of the distal end portions 96 of the confirmation member 16 projecting outward in the Z direction or lifts up the confirmation member 16 toward the plus side in the Y direction. When one does so, as shown in FIG. 12A and FIG. 12B, the projections 94 move from one end to the other end of the guide grooves 44. In other words, when one pushes inward in the Z direction the sections of the distal end portions 96 of the confirmation member 16 projecting outward in the Z direction or lifts up the confirmation member 16 toward the plus side in the Y direction, the guide segments 46 guide the distal end portions 96 in such a way that the opening 62A in the engagement portion 62 expands. For this reason, compared to a case where the guide segments 46 are not disposed, the engagement portion 62 can be easily deformed in such a way that the opening 62A in the engagement portion 62 expands, so that the engagement between the spool 200A and the engagement portion 62 can be released.

Second Embodiment

Next, an example of a pipe connector pertaining to a second embodiment of the present invention will be described in accordance with FIG. 16 to FIG. 18. It should be noted that, regarding members identical to those in the first embodiment, identical reference signs will be assigned thereto and description thereof will be omitted, and mainly the parts differing from those in the first embodiment will be described.

Figure 16:
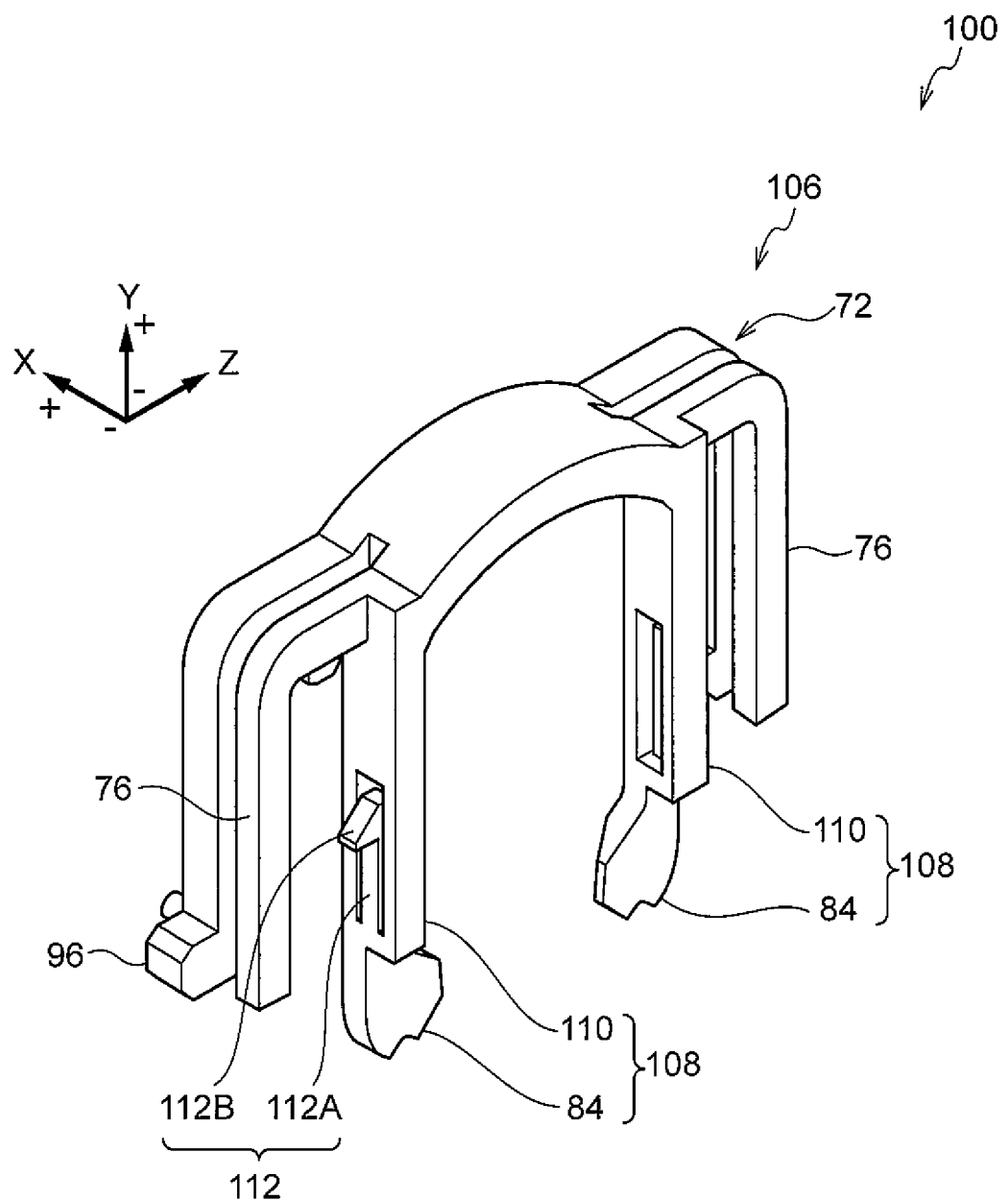
FIG. 16 is a perspective view showing a confirmation member used in a pipe connector pertaining to a second embodiment of the present invention.

As shown in FIG. 16, confirmation portions 108 of a confirmation member 106 in a pipe connector 100 pertaining to the second embodiment are equipped with extension parts 110 wider in width in the X direction than the distal end parts 84.

Regulation claws 112 serving as an example of regulation segments that extend toward the plus side in the Y direction and whose distal end portions project outward in the Z direction are formed in the extension parts 110. Specifically, the regulation claws 112 are equipped with bar parts 112A, whose base ends are secured to the extension parts 110 and whose distal ends on the plus side in the Y direction are free ends, and projections 112B, which project from the distal end portions of the bar parts 112A outward in the Z direction.

Because of the above configuration, when the pipe 200 is inserted into the pipe connector 100 in a state in which the confirmation member 106 has been placed in the temporary fastening position, as shown in FIG. 17A and FIG. 17B, the free end portions of the extension parts 110 become elastically deformed outward in the Z direction. Additionally, the mating between the recessed grooves 84A and the top portions 48C is released, and movement, toward the minus side in the Y direction, of the confirmation member 106 placed in the temporary fastening position becomes possible. In this state, the projections 112B of the regulation claws 112 come into contact with the inner walls of the rails 40B, and the distal ends of the bar parts 112A become elastically deformed and bend inward in the Z direction. Furthermore, the spool 200A of the pipe 200 and the engagement portion 62 become engaged with one another.

To release the engagement between the spool 200A and the engagement portion 62, one pushes inward in the Z direction the sections of the distal end portions 96 of the confirmation member 106 projecting outward in the Z direction or lifts up the confirmation member 106 toward the plus side in the Y direction. When one does so, as shown in FIG. 18, the projections 112B of the regulation claws 112 also move toward the plus side in the Y direction. Additionally, when the projections 112B reach the Y-direction plus side of the rails 40B, the regulation claws 112 elastically return to their original state and the projections 112B become caught on the end portions of the rails 40B.

In a state in which the projections 112B are caught on the end portions of the rails 40B, as was described using FIG. 15B in the first embodiment, the distal end portions 96 pull up the projecting portions 64 toward the plus side in the Y direction, the opening 62A in the engagement portion 62 expands, and the engagement between the spool 200A and the engagement portion 62 is released. Additionally, when the engagement portion 62 whose opening 62A has been spread tries to elastically return to its original state, the confirmation member 106 tries to move toward the minus side in the Y direction.

Figure 18:
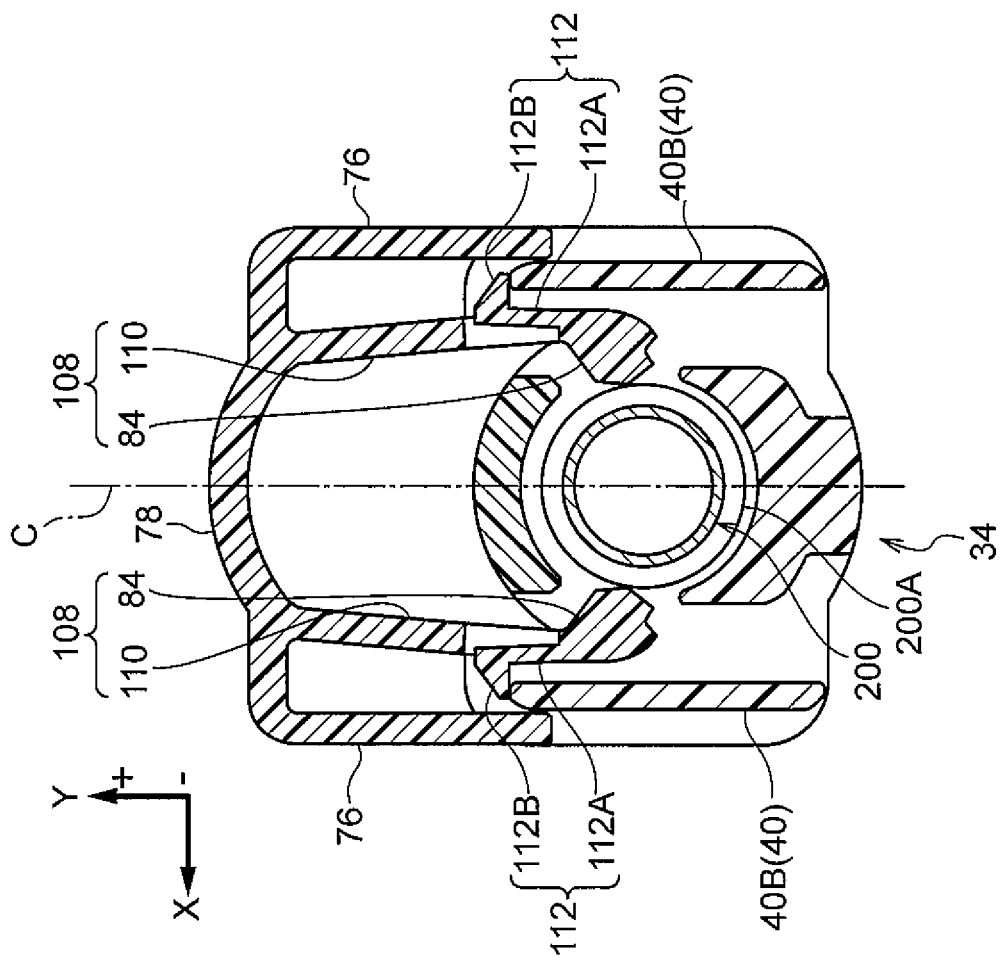
FIG. 18 is a cross-sectional view showing, in the pipe connector pertaining to the second embodiment of the present invention, a state in which the confirmation member has been lifted up from the temporary fastening position being maintained.

However, as shown in FIG. 18, the projections 112B are caught on the end portions of the rails 40B, so movement of the confirmation member 106 toward the minus side in the Y direction is regulated and the state in which the engagement between the spool 200A and the engagement portion 62 is released is maintained.

Because of this, even when the pushing force (an example of holding force) pushing the sections of the distal end portions 96 of the guide portions 88 projecting outward in the Z direction or the lift-up force (an example of holding force) that lifts up the confirmation member 106 toward the plus side in the Y direction is released, the pipe 200 can be removed from the insertion hole 20.

It should be noted that, although the present invention has been described in detail in regard to particular embodiments, the present invention is not limited to these embodiments and it will be apparent to a person skilled in the art that a variety of other embodiments are possible in the scope of the present invention. For example, in the above embodiments, by moving the retainer 14 toward the minus side in the Y direction and attaching it to the attachment segment 24, the retainer 14 becomes sandwiched between the opposing wall portion 32 and the tube segment 22 in the X direction, and thus movement of the retainer 14 in the X direction is prevented, but the present invention is not particularly limited to this and may also have another configuration provided that it is a configuration where movement of the retainer 14 in the X direction is prevented by moving the retainer 14 toward the minus side in the Y direction and attaching it to the attachment segment 24.

Furthermore, in the above embodiments, the pair of recessed portions 56A (see FIG. 7) and the pair of hook portions 58 (see FIG. 8) are used to secure the retainer 14 to the housing 12, but either one is also alright.

Furthermore, although it was not particularly described in the second embodiment, after the spool 200A of the pipe 200 and the engagement portion 62 become engaged to one another, the confirmation member 106 may be moved to the engagement confirmation position and then the confirmation member 106 may be moved toward the plus side in the Y direction.

REFERENCE SIGNS LIST

10 Pipe Connector
12 Housing
14 Retainer (An Example of a Regulation and Prevention Member)
20 Insertion Hole
24 Attachment Segment
28 O-ring
50 Regulation Segment
52 Prevention Segment
60 Regulation Surface
200 Pipe
200A Spool

The invention claimed is:

1. A pipe connector comprising:
a housing in which is formed an insertion hole into which is inserted an end portion of a pipe having an annular spool;
an O-ring that is placed in the insertion hole, is in contact with an outer peripheral surface of the pipe inserted into the housing, and seals the space between an inner peripheral surface of the insertion hole and the outer peripheral surface of the pipe; and
a regulation and prevention member that is attached to the housing from a direction that is normal to an insertion direction of the pipe, the regulation and prevention member being a one-piece structure made of a resin material and the regulation and prevention member having:
a regulation segment that regulates the position, in the insertion direction, of the O-ring placed in the insertion hole; and
a prevention segment that engages with the spool of the pipe having the end portion inserted into the insertion hole and prevents the pipe from being removed from the insertion hole.

2. The pipe connector according to claim 1, further comprising an attachment segment formed on an insertion side of the insertion hole into which the pipe is inserted, wherein the attachment segment configures the housing, and the regulation and prevention member is attached to the attachment segment, wherein the O-ring is placed in an end portion of the insertion hole on the insertion side in the insertion direction, and
further comprising a regulation surface formed in the regulation segment of the regulation and prevention member attached to the attachment segment, wherein the regulation surface is in contact with the O-ring in the insertion direction and regulates movement of the O-ring in the insertion direction.

3. The pipe connector according to claim 2, wherein the regulation and prevention segments of the regulation and prevention member are part of the one-piece structure made of the resin material.

4. The pipe connector according to claim 1, wherein the regulation and prevention segments of the regulation and prevention member are of the one-piece structure made of the resin material.

* * * * *

UNITED STATES PATENT AND TRADEMARK OFFICE
CERTIFICATE OF CORRECTION

PATENT NO. : 9,746,116 B2
APPLICATION NO. : 14/783236
DATED : August 29, 2017
INVENTOR(S) : Koji Tayama et al.

It is certified that error appears in the above-identified patent and that said Letters Patent is hereby corrected as shown below:

In the Claims

At Column 16, Line 55, "are of" should be -- are part of --.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*